(12) United States Patent
Luqman et al.

(10) Patent No.: US 11,227,151 B2
(45) Date of Patent: Jan. 18, 2022

(54) METHODS AND SYSTEMS FOR COMPUTERIZED RECOGNITION OF HAND GESTURES

(71) Applicant: King Fahd University of Petroleum and Minerals, Dhahran (SA)

(72) Inventors: Hamzah Luqman, Dhahran (SA);
El-Sayed M. El-Alfy, Dhahran (SA);
Galal M. Binmakhashen, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/809,939

(22) Filed: Mar. 5, 2020

(65) Prior Publication Data

US 2021/0279453 A1    Sep. 9, 2021

(51) Int. Cl.
*G06K 9/62* (2006.01)
*G06K 9/00* (2006.01)
(Continued)

(52) U.S. Cl.
CPC ......... *G06K 9/00355* (2013.01); *G06K 9/628* (2013.01); *G06K 9/6262* (2013.01); *G06N 3/04* (2013.01); *G06N 3/08* (2013.01)

(58) Field of Classification Search
CPC .. G06K 9/00355; G06K 9/6262; G06K 9/628; G06N 3/08; G06N 3/04
See application file for complete search history.

(56) References Cited

U.S. PATENT DOCUMENTS

| 10,429,944 | B2 * | 10/2019 | Hebbalaguppe | ..... G06K 9/6256 |
| 10,877,558 | B1 * | 12/2020 | Zhao | ..... G06F 3/017 |

(Continued)

FOREIGN PATENT DOCUMENTS

| CN | 109255324 A | 1/2019 |
| CN | 109871781 A | 6/2019 |
| CN | 110175551 A | 8/2019 |

OTHER PUBLICATIONS

Indian Sign Language Recognition Using Gabor Feature Extraction Itkarkar Rajeshri R, Anil Kumar V. Nandi, Vaishali B. Mungurwadi (Year: 2019).*

(Continued)

*Primary Examiner* — Dhaval V Patel
(74) *Attorney, Agent, or Firm* — Oblon, McClelland, Maier & Neustadt, L.L.P.

(57) ABSTRACT

Methods, systems, and computer readable media for recognizing one or more hand gestures of a hand-based signal or conversation are described. Some implementations include obtaining one or more unprocessed images of the hand-based signal or conversation including images of at least one of the one or more hand gestures extracting one or more spectral features from the one or more unprocessed images using a Gabor filter bank, receiving the one or more unprocessed images of the one or more hand gestures and the extracted one or more spectral features by a Convolution Neural Network (CNN), and outputting a classification for the at least one of the one or more hand gestures using the Convolution Neural Network (CNN). In some implementations, at least one of the extracted one or more spectral features and at least one of the one or more unprocessed images of the one or more hand gestures are concatenated and input to the Convolution Neural Network (CNN).

18 Claims, 12 Drawing Sheets

(51) Int. Cl.
*G06N 3/08* (2006.01)
*G06N 3/04* (2006.01)

(56) References Cited

U.S. PATENT DOCUMENTS

| | | | | |
|---|---|---|---|---|
| 2017/0192513 | A1* | 7/2017 | Karmon | G06F 3/0304 |
| 2018/0322338 | A1* | 11/2018 | Mahmoud | G06K 9/00389 |
| 2020/0005028 | A1* | 1/2020 | Gu | G06K 9/00389 |
| 2020/0356178 | A1* | 11/2020 | Qiu | G01S 7/003 |
| 2020/0410337 | A1* | 12/2020 | Huang | G06N 3/04 |
| 2021/0097650 | A1* | 4/2021 | Kobayashi | G06T 5/002 |

OTHER PUBLICATIONS

Hand Gesture Recognition for Sign Language Transcription; by Iker Vazquez Lopez (Year: 2017).*

Fernandez, et al.; Hand Posture Recognition Using Convolutional Neural Network ; Springer International Publishing AG, Spring Nature 2018 ; pp. 441-449 ; 9 Pages.

Mohandes, et al.; Automation of the Arabic Sign Language Recognition ; IEEE 2004 ; 2 Pages.

Munib, et al.; American sign language (ASL) recognition based on Hough transform and neural networks ; ScienceDirect, Expert Systems with Applications 32 ; pp. 24-37 ; 2007 ; 14 Pages.

Pugeault, et al.; Spelling It Out: Real-Time ASL Fingerspelling Recognition ; IEEE International Conference on Computer Vision Workshops ; 2011 ; 6 Pages.

Bheda, et al.; Using Deep Convolutional Networks for Gesture Recognition in American Sign Language ; Oct. 14, 2017 ; 5 Pages.

Ranga, et al.; American Sign Language Fingerspelling Using Hybrid Discrete Wavelet Transform-Gabor Filter and Convolutional Neural Network ; Journal of Engineering Science and Technology, vol. 13, No. 9 ; pp. 2655-2669 ; 2018 ; 15 Pages.

Islam, et al.; Hand Gesture Feature Extraction Using Deep Convolutional Neural Network for Recognizing American Sign Language ; $4^{th}$ International Conference on Frontiers of Signal Processing ; 2018 ; 5 Pages.

Rastgoo, et al.; Multi-Modal Deep Hand Sign Language Recognition in Still Images Using Restricted Boltzmann Machine ; MDPI entropy ; Oct. 23, 2018 ; 15 Pages.

Chakraborty, et al.; Trigger Detection System for American Sign Language using Deep Convolutional Neural Networks ; IAIT ; Dec. 10-13, 2018 ; 6 Pages.

* cited by examiner

Fig. 9

METHODS AND SYSTEMS FOR COMPUTERIZED RECOGNITION OF HAND GESTURES

BACKGROUND

Technical Field

The present disclosure is directed generally to computerized recognition of hand gestures, and, more particularly, to methods, computer readable media, and systems for recognizing hand gestures of sign languages, including, for example, a spectral-spatial deep interpreter for recognizing and interpreting one or more hand sign language alphabets.

BACKGROUND

Sign language facilitates communication with people who are deaf or have auditory impairments (ranging from mild to severe). According to the World Health Organization (WHO), around 466 million individuals worldwide, i.e., about 6% of the world's population, have disabling hearing loss; and this number is estimated to double by 2050. (See, Hearing loss statistics. URL: https://wwwwhoint/newsroom/fact-sheets/detail/deafness-and-hearingloss, which is incorporated herein by reference). Hearing-impaired people depend greatly on sign language for day-to-day activities and to engage with their society, e.g., to communicate with other people, to access information on television, and to learn in schools.

Sign languages are geography specific, i.e., several sign languages may exist around the world and sometimes within the same country. (See, Sidig A A I, Lugman H, Mahmoud S A (2017) *Transform-based Arabic sign language recognition*. Procedia Computer Science 117:2-9, DOI 10.1016/j.procs.2017.10.087, which is incorporated herein by reference). Even countries with the same spoken language, for example, English, may have different sign languages, as exemplified by the American Sign Language (ASL) and the British Sign Language (BSL).

Sign language is one form of visual gesture communication that simultaneously employs hand gestures, facial expressions, and other body-part postures to convey meaning. (See, Nair A V, Bindu V (2013) *A Review on Indian Sign Language Recognition*. International Journal of Computer Applications 73(22):33-38, which is incorporated herein by reference). Hand gestures are the primary component of sign languages that are utilized by individuals to express motion and thoughts. (See, Cheok M J, Omar Z, Jaward M H (2019) *A review of hand gesture and sign language recognition techniques*. International Journal of Machine Learning and Cybernetics 10(1):131-153, which is incorporated herein by reference).

Hand gestures in sign language can be classified into static and dynamic gestures, depending on whether the motion of the hand is part of sign expression and interpretation. Static gestures complement dynamic gestures and mainly depend on the shape and orientation of the hand and the fingers. (See, Pisharady P K, Saerbeck M (2015) *Recent methods and databases in vision-based hand gesture recognition: A review*. Computer Vision and Image Understanding 141:152-165, which is incorporated herein by reference). Static gestures in sign languages are typically used for finger-spelling of alphabets and digits whereas dynamic gestures are typically used in word expression and interpretation. (See, Luqman H, Mahmoud S A (2018) *Automatic translation of arabic text-to-arabic sign language*. Universal Access in the Information Society pp 1-13, which is incorporated herein by reference).

Automatically interpreting hand gestures is gaining importance in the field of human-machine communication and interaction. A number of approaches have been proposed for automatic sign language recognition during the last decade. These techniques can be classified into three broad categories based on the data acquisition method employed: (a) sensor based, (b) vision-based, and (c) a hybrid of both of these. ((See, Ahmed M A, Zaidan B B, Zaidan A A, Salih M M, Lakulu M Mb (2018) *A review on systems-based sensory gloves for sign language recognition state of the art between 2007 and 2017*. Sensors 18(7):2208, which is incorporated herein by reference), (See, Shivashankara S, Srinath S (2017) *A comparative study of various techniques and outcomes of recognizing american sign language: A review*. International Journal of Scientific Research Engineering & Technology (IJSRET) 6(9):1013-1023, which is incorporated herein by reference)). Sensor-based techniques employ a set of sensors to detect and track hands and fingers. These sensors/devices may come in various forms, such as leap motion, Microsoft Kinect, and electronic gloves. Some examples of data acquisition devices, including sensors, are shown in FIG. 1.

Signers may find this approach expensive, uncomfortable, or impractical due to the requirement of installing or wearing cumbersome instruments while signing. (See, Nair A V, Bindu V (2013) *A Review on Indian Sign Language Recognition*. International Journal of Computer Applications 73(22):33-38, which is incorporated herein by reference). Moreover, signs with complex gestures may be difficult or impossible to perform. In contrast, vision-based approaches use a single video camera or multiple cameras to capture the signs and store them as a sequence of images for processing. Unlike sensor-based techniques, vision-based techniques exhibit different challenges such as challenges related to hand detection, segmentation, and tracking. (See, Mohandes M, Deriche M, Liu J (2014) *Image-based and sensor-based approaches to arabic sign language recognition*. IEEE transactions on human-machine systems 44(4):551-557, which is incorporated herein by reference).

Deep learning has recently become a major feature in computer vision and has been explored for sign language recognition. (See, Rastgoo R, Kiani K, Escalera S (2018) *Multi-modal deep hand sign language recognition in still images using restricted boltzmann machine*. Entropy 20(11): 809, which is incorporated herein by reference). This technique requires a large amount of data to learn and configure a vast parameter set. Unfortunately, sign languages are low-resourced languages, especially for non-western languages such as Arabic Sign Language (ArSL), where the lack of reliable data is a common problem.

On the other hand, Gabor filtering is an efficient technique for extracting spatial information such as texture and edges. (See, Chen Y, Zhu L, Ghamisi P, Jia X, Li G, Tang L (2017) *Hyperspectral images classification with gabor filtering and convolutional neural network*. IEEE Geoscience and Remote Sensing Letters 14(12):2355-2359, which is incorporated herein by reference). Gabor filters were studied thoroughly and were found to be effective in extracting discriminative features compared to other filtering techniques. (See, Mehri M, Héroux P, Gomez-Krämer P, Mullot R (2017) *Texture feature benchmarking and evaluation for historical document image analysis*. International Journal on Document Analysis and Recognition (IJDAR) 20(1):1-35, which is incorporated herein by reference).

Combining both approaches can lead to improvement in the effectiveness of a sign-language recognition system. Gabor based features can be used as input to a Convolutional Neural Network (CNN) to reduce the need for feature extraction in traditional machine learning approaches. A number of techniques have been proposed in the literature, with a focus on the recognition of sign language alphabets using traditional and deep learning approaches. In 2007, a system was proposed to recognize 20 alphabets of ASL using Hough transform for feature extraction and a neural network for classification. (See, Munib Q, Habeeb M, Takruri B, Al-Malik H A (2007) *American sign language (asl) recognition based on hough transform and neural networks*. Expert systems with Applications 32(1):24-37, which is incorporated herein by reference). Using a dataset consisting of 300 images performed by 15 signers, an accuracy of 92.3% was reported.

More recently, some researchers have used CNN to recognize 24 gestures of ASL database. (See, Ranga V, Yadav N, Garg P (2018) *American sign language fingerspelling using hybrid discrete wavelet transform-gabor filter and convolutional neural network. Journal of Engineering Science and Technology* 13(9):2655-2669; and Barczak A, Reyes N, Abastillas M, Piccio A, Susnjak T (2011) *A new 2d static hand gesture colour image dataset for asl gestures*, which are incorporated herein by reference). This database is divided into training and testing in two different ways: signer-dependent and signer-independent. The signer-dependent dataset has signer images shuffled and further divided into training and testing sets whereas the signer-independent dataset uses four signers for training and the fifth signer for testing. Using these two datasets, the best reported accuracies were 97.01% and 76.25% on signer-dependent and signer-independent datasets respectively. Using 26 alphabets of the same database, an accuracy of 82.5% has been reported employing another model of CNN. (See, Bheda V, Radpour D (2017) *Using deep convolutional networks for gesture recognition in american sign language*. arXiv preprint arXiv:171006836, which is incorporated herein by reference).

Other researchers have proposed a system to recognize the digits and alphabets of ASL using saliency detection, which is a popular method in computer vision to automatically locate important (or salient) parts of an image. (See, Zamani M, Kanan H R (2014) *Saliency based alphabet and numbers of american sign language recognition using linear feature extraction*. In: 20144th International Conference on Computer and Knowledge Engineering (ICCKE), IEEE, pp 398-403, which is incorporated herein by reference). This approach used principal component analysis (PCA) and linear discriminant analysis (LDA), followed by neural network classification. Using a database consisting of 36 gestures, the researchers demonstrated an accuracy of 99.88% with a 4-fold cross validation technique. (See, Barczak A, Reyes N, Abastillas M, Piccio A, Susnjak T (2011) *A new 2d static hand gesture colour image dataset for asl gestures*, which is incorporated herein by reference).

A hierarchical classification method has been proposed that includes integrating PCA, LDA, and Support Vector Machine (SVM) techniques to classify combined features that were extracted using Bag-of-Words, Hu Moments, and Fourier Descriptors (FDs). (See, Pan T Y, Lo L Y, Yeh C W, Li J W, Liu H T, Hu M C (2016) *Real-time sign language recognition in complex background scene based on a hierarchical clustering classification method*. In: 2016 IEEE Second International Conference on Multimedia Big Data (BigMM), IEEE, pp 64-67, which is incorporated herein by reference). This technique achieved an accuracy of 99.8% and 94% on the Chinese Sign Language (CSL) dataset and the ASL dataset respectively.

Two-dimensional Zernike moments (2D-ZMs) were compared with PCA and FDs to classify 10 alphabets of ASL, and they achieved an accuracy of 98.51%. (See, Aowal M A, Zaman A S, Rahman S M, Hatzinakos D (2014) *Static hand gesture recognition using discriminative 2d zernike moments*. In: TENCON 2014-2014 IEEE Region 10 Conference, IEEE, pp 1-5, which is incorporated herein by reference). The same features, i.e., Zernike moments, were concatenated with Gabor features in one study, but the accuracy then decreased to 97.63% over 36 gestures of ASL. (See, Chevtchenko S F, Vale R F, Macario V (2018) *Multi-objective optimization for hand posture recognition*. Expert Systems with Applications 92:170-181, which is incorporated herein by reference).

Other techniques include temporal prediction and accumulated differences to represent the motion in ArSL video streams using a single image. (See, Shanableh T, Assaleh K (2007) *Arabic sign language recognition in user-independent mode*. 2007 International Conference on Intelligent and Advanced Systems pp 597-600, which is incorporated herein by reference). This image was then transformed into a frequency domain using discrete cosine transform followed by zonal coding to extract spatial features, which were then classified by k-nearest neighbors (KNN), Bayesian, and Hidden Markov Model (HMM) classifiers. The reported accuracy on a dataset of 23 signs revealed that KNN and Bayesian achieve results comparable to HMM. Nevertheless, the performance of this technology is sensitive to the environment in which it is used, and is based on factors such as background texture, color, and lighting conditions of the environment. (See, Zhang X, Chen X, Li Y, Lantz V, Wang K, Yang J (2011) *A framework for hand gesture recognition based on accelerometer and emg sensors*. IEEE Transactions on Systems, Man, and Cybemetics-Part A: Systems and Humans 41(6):1064-1076, which is incorporated herein by reference).

Other techniques have used an ASL recognition system based on depth images of American sign alphabets using multi-view augmentation fusion and CNN. (See, Tao W, Leu M C, Yin Z (2018) *American sign language alphabet recognition using convolutional neural networks with multiview augmentation and inference fusion*. Engineering Applications of Artificial Intelligence 76:202-213, which is incorporated herein by reference). This method addressed partial occlusions and minimized the effect of perspective variations by generating several views from different perspectives and fused their predictions in order to determine the final sign classification. The method extracted deep features by passing the processed (32×32) sign images through three convolution layers. This maximum pooling method reduced output of the convolution layers to half the size. A fully connected layer was then implemented to classify the resulting feature map of a given sign image into the proper image sign class.

Other techniques have used two datasets, the American Sign language (depth color) and the NTU digit dataset, for validation. (See, Pugeault N, Bowden R (2011) *Spelling it out: Real-time asl fingerspelling recognition*. In: 2011 IEEE International conference on computer vision workshops (ICCV workshops), IEEE, pp 1114-1119; and Ren Z, Yuan J, Zhang Z (2011) *Robust hand gesture recognition based on finger-earth mover's distance with a commodity depth cam-*

*era*. In: Proceedings of the 19th ACM international conference on Multimedia, ACM, pp 1093-1096, which are incorporated herein by reference).

Other techniques include a low-cost hand gesture recognition system using CNN and SVM. (See, Islam M R, Mitu U K, Bhuiyan R A, Shin J (2018) *Hand gesture feature extraction using deep convolutional neural network for recognizing american sign language*. In: 2018 4th International Conference on Frontiers of Signal Processing (ICFSP), IEEE, pp 115-119, which is incorporated herein by reference). The CNN was designed to extract features from video frames of hand signs whereas SVM was used to classify these images into one of the American alphabet signs. The highest reported result was 94.57% accuracy for the proposed system.

Still other techniques have used a Bayesian model of visual attention for hand segmentation. (See, Pisharady P K, Vadakkepat P, Loh A P (2013) *Attention based detection and recognition of hand postures against complex backgrounds*. International Journal of Computer Vision 101(3):403-419, which is incorporated herein by reference). Shape and texture features were used to classify the hand(s) using an SVM classifier and an accuracy of 94.36% was reported using 2750 hand postures.

A hybrid feature fusion of finger angle count, Hu moment invariant, and skin and non-skin color angles have been used. (See, Yun L, Lifeng Z, Shujun Z (2012) *A hand gesture recognition method based on multi-feature fusion and template matching*. Procedia Engineering 29:1678-1684, which is incorporated herein by reference). This method was evaluated on a dataset consisting of 10 gestures and achieved an accuracy of 91%. Local Binary Pattern (LBP) texture operator was used by some researchers for recognizing static gestures of some sign languages, including American, Arabic, Bangladeshi, and Chinese sign languages. (See, Ding Y, Pang H, Wu X, Lan J (2011) *Recognition of hand-gestures using improved local binary pattern*. In: 2011 International Conference on Multimedia Technology, IEEE, pp 3171-3174; Sidig A A I, Luqman H, Mahmoud S A (2017) *Arabic sign language recognition using optical flow-based features and hmm*. In: International Conference of Reliable Information and Communication Technology, Springer, pp 297-305; and Jasim M, Hasanuzzaman M (2014) *Sign language interpretation using linear discriminant analysis and local binary patterns*. In: 2014 International Conference on Informatics, Electronics & Vision (ICIEV), IEEE, pp 1-5, which are incorporated herein by reference).

Some techniques include a Gaussian skin color model to detect the signer's face and used this as a reference to track hand(s) motion of ArSL. (See, Mohandes M, Deriche M (2005) *Image based arabic sign language recognition*. In: Proceedings of the Eighth International Symposium on Signal Processing and Its Applications, 2005, IEEE, vol 1, pp 86-89, which is incorporated herein by reference). A number of geometric features were extracted from hand regions across a sequence of images and entered into HMM. This technique was evaluated on 50 signs and achieved 92% accuracy.

Some implementations of the present disclosure were conceived in light of the above-mentioned problems and limitations of computerized methods and systems for recognizing hand gestures of a sign language.

SUMMARY

Some implementations include a computerized method for recognizing one or more hand gestures of a hand-based signal or conversation. In some implementations, the method comprises: obtaining one or more unprocessed images of the hand-based signal or conversation, wherein the one or more unprocessed images include images of at least one of the one or more hand gestures, and wherein the one or more unprocessed images are being processed to determine a meaning of the hand-based signal or conversation; extracting one or more spectral features from the one or more unprocessed images using a Gabor filter bank, receiving the one or more unprocessed images of the one or more hand gestures and the extracted one or more spectral features by a Convolution Neural Network (CNN), and outputting a classification for the at least one of the one or more hand gestures using the Convolution Neural Network (CNN), wherein the classification is selected by the CNN from among a plurality of candidate classifications to determine the meaning of the hand-based signal or conversation. In some implementations, the Convolution Neural Network (CNN) has an architecture that includes a convolution layer with 128 kernels of size 5×5 with a stride of 1 pixel.

In some implementations, the Gabor filter bank performs Gabor filtering with a single scale and orientation to the one or more unprocessed images of the at least one of the one or more hand gestures, and wherein one or more of imaginary, phase, magnitude, or real Gabor responses are extracted as the extracted one or more spectral features for the one or more unprocessed images. In some other implementations, the Gabor filter bank performs Gabor filtering with four scales and four orientations, wherein one or more of imaginary, phase, magnitude, or real Gabor responses are extracted as the extracted one or more spectral features for the one or more unprocessed images. In some implementations, at least one of the extracted one or more spectral features and at least one of the one or more unprocessed images of the one or more hand gestures are concatenated and input to the Convolution Neural Network (CNN).

In some implementations, the hand-based signal or conversation includes a sign language that comprises at least one of an American MNIST replacement sign language alphabet (MNIST ASL), an Arabic sign language alphabet (ArSL), or a Massey University ASL dataset (MUASL). Some implementations may include creating a dataset from the sign language, wherein the dataset includes at least one of cropped hand gesture images, hand gesture images with noise added thereto, or the cropped hand gesture images with the noise added thereto. In some implementations, the Convolution Neural Network (CNN) includes at least 11 layers followed by a Softmax classifier, and wherein one or more of the 11 layers is followed by one or more of an ReLU activation function, max-pooling, batch normalization, dropout, or one or more fully connected layers.

Some implementations may include a system for recognizing one or more hand gestures of a hand-based signal or conversation. The system may comprise one or more processors and a non-transitory computer readable storage having software instructions stored thereon configured to cause the one or more processors: to obtain one or more unprocessed images of the hand-based signal or conversation, wherein the one or more unprocessed images include images of at least one of the one or more hand gestures, and wherein the one or more unprocessed images are being processed to determine a meaning of the hand-based signal or conversation; to extract one or more spectral features from the one or more unprocessed images using a Gabor filter bank, receive the one or more unprocessed images of the one or more hand gestures and the extracted one or more spectral features by a Convolution Neural Network (CNN), and output a classification for the at least one of the one or more hand gestures using the (CNN), wherein the classification is selected by the CNN from among a plurality of candidate classifications to determine the meaning of the hand-based signal or conversation. In some implementations of the system for recognizing one or more hand gestures of a sign language, the Convolution Neural Network (CNN) has an architecture that includes a convolution layer with 128 kernels of size 5×5 with a stride of 1 pixel.

In some implementations, the Gabor filter bank performs Gabor filtering with a single scale and orientation to the one or more unprocessed images of the at least one of the one or more hand gestures, and wherein one or more of imaginary, phase, magnitude, or real Gabor responses are extracted as the extracted one or more spectral features for the one or more unprocessed images. In some other implementations, the Gabor filter bank performs Gabor filtering with four scales and four orientations, wherein one or more of imaginary, phase, magnitude, or real Gabor responses are extracted as the extracted one or more spectral features for the one or more unprocessed images. In some implementations, at least one of the extracted one or more spectral features and at least one of the one or more unprocessed images of the one or more hand gestures are concatenated and input to the Convolution Neural Network (CNN).

Some implementations may include a non-transitory computer readable medium having instructions stored therein that, when executed by one or more processors, cause the one or more processors to perform a method for recognizing one or more hand gestures of a hand-based signal or conversation. In some implementations, the method comprises: obtaining one or more unprocessed images of the hand-based signal or conversation, wherein the one or more unprocessed images include images of at least one of the one or more hand gestures, and wherein the one or more unprocessed images are being processed to determine a meaning of the hand-based signal or conversation; extracting one or more spectral features from the one or more unprocessed images using a Gabor filter bank, receiving the one or more images of the one or more hand gestures and the extracted one or more spectral features by a Convolution Neural Network (CNN), and outputting a classification for the at least one of the one or more hand gestures using the Convolution Neural Network (CNN), wherein the classification is selected by the CNN from among a plurality of candidate classifications to determine the meaning of the hand-based signal or conversation. In some implementations of the non-transitory computer readable medium, the Convolution Neural Network (CNN) has an architecture that includes a convolution layer with 128 kernels of size 5×5 with a stride of 1 pixel.

In some implementations, the Gabor filter bank performs Gabor filtering with a single scale and orientation to the one or more unprocessed images of the at least one of the one or more hand gestures, and wherein one or more of imaginary, phase, magnitude, or real Gabor responses are extracted as the extracted one or more spectral features for the one or more unprocessed images. In some other implementations, the Gabor filter bank performs Gabor filtering with four scales and four orientations, wherein one or more of imaginary, phase, magnitude, or real Gabor responses are extracted as the extracted one or more spectral features for the one or more unprocessed images. In some implementations, at least one of the extracted one or more spectral features and at least one of the one or more unprocessed images of the one or more hand gestures are concatenated and input to the Convolution Neural Network (CNN).

In some implementations, the hand-based signal or conversation includes a sign language that comprises at least one of an American MNIST replacement sign language alphabet (MNIST ASL), an Arabic sign language alphabet (ArSL), or a Massey University ASL dataset (MUASL). Some implementations may include creating a dataset from the sign language, wherein the dataset includes at least one of cropped hand gesture images, hand gesture images with noise added thereto, or the cropped hand gesture images with the noise added thereto. In some implementations, the Convolution Neural Network (CNN) includes at least 11 layers followed by a Softmax classifier, and wherein one or more of the 11 layers is followed by one or more of an ReLU activation function, max-pooling, batch normalization, dropout, or one or more fully connected layers.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 9 is an example confusion matrix using an exemplary MUASL database with 26 hand gestures in accordance with some implementations;

DETAILED DESCRIPTION

Figure 1A:
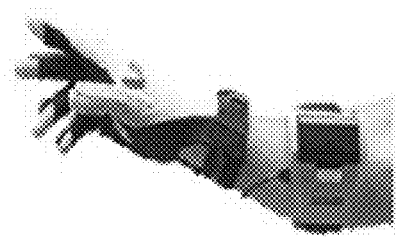
FIGS. 1A-1F show example data acquisition devices and sensors for capturing hand gestures of a sign language in accordance with some implementations.
Figure 1B:
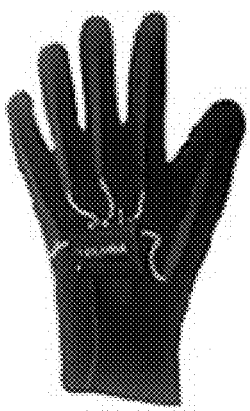
Figure 1C:
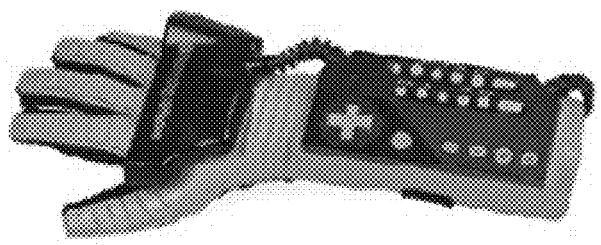
Figure 1D:
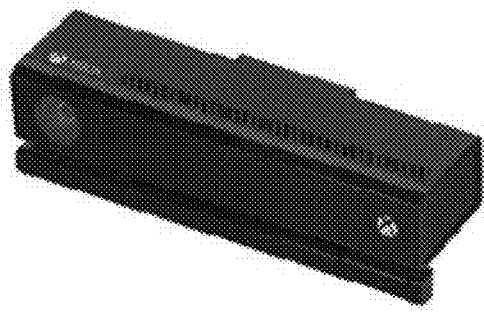
Figure 1E:
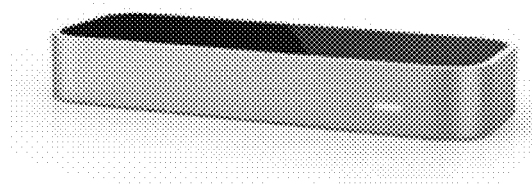
Figure 1F:

In the drawings, like reference numerals designate identical or corresponding parts throughout the several views.

Further, as used herein, the words "a," "an," and the like generally carry a meaning of "one or more," unless stated otherwise. The drawings are generally drawn to scale unless specified otherwise or illustrating schematic structures or flowcharts.

In some implementations, a technique for recognizing sign language alphabets employs a Gabor filter bank in conjunction with a convolutional neural network (CNN). In some implementations, this technique uses Gabor filtering to extract spectral features from hand gesture images and uses CNN to classify the features into corresponding classes. The spectral features and the hand gesture images (i.e., spatial information) are concatenated in several ways to identify a model that best improves the accuracy of the exemplary system.

The exemplary system is evaluated using three databases, namely MNIST, ArSL, and MUASL. (See, *Mnist sign language database*. URL: https://wwwkagglecom/datamunge/sign-language-mnist; Ghazanfar L, Jaafar A, Nazeeruddin M, Roaa A, Rawan A (2018) *Arabic alphabets sign language dataset (arasl)*, URL:https://datamendeleycom/datasets/y7pckrw6z2/1; and Barczak A, Reyes N, Abastillas M, Piccio A, Susnjak T (2011) *A new 2d static hand gesture colour image dataset for ASL gestures*, all of which are incorporated herein by reference). Several experiments were conducted and the results analyzed and compared for a variety of scenarios thereby leading to the implementations described below.

Some implementations employ a new classification framework combining Gabor filtering and a CNN for recognizing sign language alphabets. In some implementations, advanced deep learning techniques such as dropout, rectified linear (ReLU), and batch normalization techniques (discussed in detail below) are employed to improve the accuracy of the implementation. Some implementations augment training data by cropping and adding noise to increase the reliability of the model and improve the overall accuracy of the model. In some implementations, high recognition rates have been reported (using three different databases) as compared to recognition rates reported by previously documented state-of-the-art techniques.

Gabor filters can extract information that sometimes may not be directly learned from spatial images. (See, Yao H, Chuyi L, Dan H, Weiyu Y (2016) *Gabor feature based convolutional neural network for object recognition in natural scene*. In: 2016 3rd International Conference on Information Science and Control Engineering (ICISCE), IEEE, pp 386-390, which is incorporated herein by reference). Some implementations combine Gabor filters with a CNN to extract and combine spectral and spatial feature maps to recognize hand gesture images of a sign language. In some implementations, this integration of Gabor filters with a CNN is evaluated using benchmark datasets of two sign languages.

Some implementations comprise two stages. In the first stage, sign images are used as input. An input image is preprocessed to remove background or irrelevant body parts of the signer. In some implementations, the preprocessing can include applying a background and foreground segmentation technique, and an image recognition/cropping technique to recognize the signer's hands and arms and crop those portions of the images out for processing. The result of this stage is a collection of cropped hand sign images. Spectral features are then extracted from the input signs using Gabor filtering of various orientations (or directions within the image) and scales (or magnification levels of an image). In order to generate a robust model to recognize unseen signs by new signers, in some implementations, the input images are cropped from five regions of the image. Then, Gaussian and salt-and-pepper noises are added to the input images to increase the robustness of the implemented model. The transformed images are then used to train a CNN model. The CNN model includes a plurality of classifications based on the training data. In some implementations, a classification for one or more images is selected by the CNN from among a plurality of candidate classifications to determine the meaning of the hand-based signal or conversation.

Figure 2:
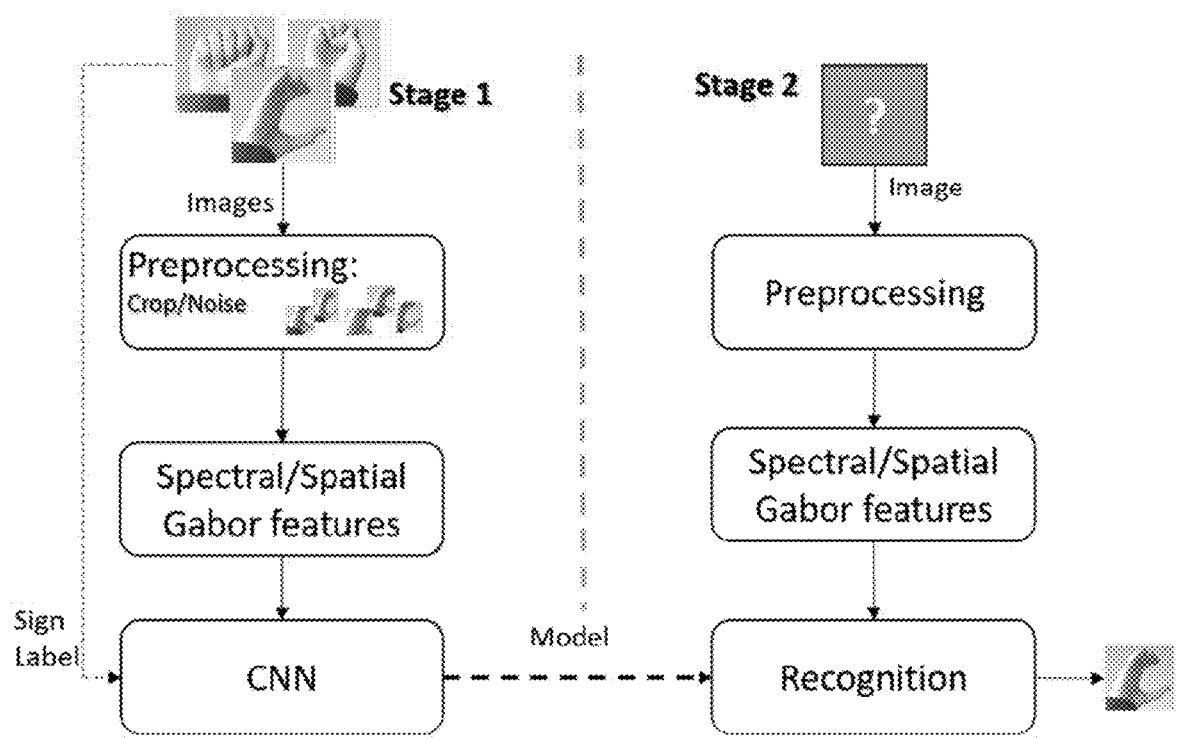
FIG. 2 is a diagram of an exemplary computerized sign language hand gesture recognition system in accordance with some implementations.

In the second stage, the trained model from the previous stage is used to recognize new input signs. FIG. 2 is a diagram of an exemplary computerized sign language hand gesture recognition system in accordance with some implementations. Components of the exemplary sign language recognition system in FIG. 2 are discussed in detail as follows.

Spectral Representation Using Gabor Filter

A) Gabor Image Representation: In some implementations, a 2D Gabor filter bank is used to transform images into spectral domain. In some implementations, the Gabor filter can be expressed as a set of kernels, each of which is dedicated for a specific frequency and direction. In addition, a Gabor Filter allows multi-resolution analysis through adjustment of its parameters in some implementations. A Gabor filter is a sinusoidal plane localized by a Gaussian window where its orientation and frequency are sensitive to a band-pass filter. (See, Zhang D, Wong A, Indrawan M, Lu G (2000) *Content-based image retrieval using gabor texture features*. In: Proc. of First IEEE Pacific-Rim Conference on Multimedia (PCM'00), which is incorporated herein by reference). In some implementations, I(x,y) is an image in a spatial domain of size L×K, wherein the discrete Gabor response can be computed by convolving I(x,y) by a Gabor kernel at scale $\rho$ and direction $\theta$ as follows:

$$IG_{\rho,\theta}(x, y) = I \circledast G^* = \sum_{\theta}\sum_{t} I(x-s, y-t)G^*_{\rho,\theta}(s, t) \quad (1)$$

where $\circledast$ is convolution operator, $(\rho, \vartheta)$ are the scale and orientation of the filter kernel, $\rho=0, 1, \ldots, P-1$, $\vartheta=0, 1, \ldots, \Theta-1$, and $G^*_{\rho,\vartheta}$ is the complex conjugate of $G_{\rho,\vartheta}$, which is computed from the dilation and rotation of a Gabor kernel or impulse response defined by:

$$G(x, y) = \frac{1}{\sqrt{2\pi\sigma_x\sigma_y}} \cdot \exp\left[-\frac{1}{2}\left(\frac{x^2}{\sigma_x^2} + \frac{y^2}{\sigma_y^2}\right)\right] \cdot \exp(j2\pi Fx) \quad (2)$$

where $(\sigma_x, \sigma_y)$ defines the spread of the Gaussian window in x and y directions, F is a modulation frequency, and the mother wavelet function is computed as:

$$G_{\rho,\vartheta}(x,y) = \alpha^{-\rho}G(X,Y) \quad (3)$$

where $\alpha > 1$, and $$X = \alpha^{-\rho}[x \cos(\vartheta\pi/\Theta) + y \sin(\vartheta\pi/\Theta)]$$

$$Y = \alpha^{-\rho}[-x \sin(\vartheta\pi/\Theta) + y \cos(\vartheta\pi/\Theta)]$$

Figure 3:
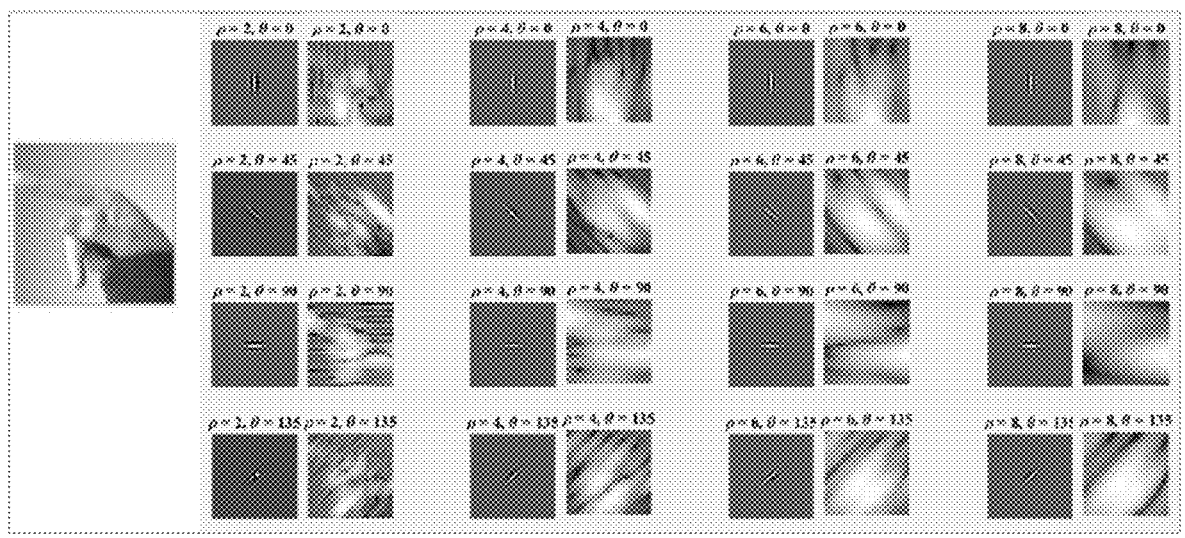
FIG. 3 shows example Gabor kernels convolved with letter "P" of a MNIST dataset using four scales and four orientations in accordance with some implementations.

FIG. 3 shows example Gabor kernels convolved with letter "P" of a MNIST dataset using four scales and four orientations in accordance with some implementations. More specifically, FIG. 3 shows an example of Gabor kernels computed using four scales and four directions by applying Equation 3 to a sign of letter 'P'.

B) Gabor Features: In some implementations, there are various features that can be extracted from Gabor filtering responses; for example, magnitude. (See, Chu R, Lei Z, Han Y, He R, Li S Z (2007) *Learning gabor magnitude features for palmprint recognition*. In: Asian Conference on Computer Vision, Springer, pp 22-31; Aljahdali S, Ansari A, Hundewale N (2012) *Classification of image database using svm with gabor magnitude*. In: 2012 International Conference on Multimedia Computing and Systems, IEEE, pp 126-132; and Li Y, Shan S, Zhang H, Lao S, Chen X (2012) *Fusing magnitude and phase features for robust face recognition*. In: Asian Conference on Computer Vision, Springer, pp 601-612, which are incorporated herein by reference). The Gabor features are useful because they usually carry stable and global information descriptions about textures of corresponding images. For example, Gabor features are generally less sensitive to small image variations.

On the other hand, the phase part of Gabor responses may be avoided due to its sensitivity to image variations and the o☐set location of the filter. However, the phase part may provide useful information for some applications such as biometrics recognition. (See, Li Y, Shan S, Zhang H, Lao S, Chen X (2012) *Fusing magnitude and phase features for robust face recognition*. In: Asian Conference on Computer Vision, Springer, pp 601-612; and BinMakhashen G M, El-Alfy E S M (2012) *Fusion of multiple texture representations for palmprint recognition using neural networks*. In: International Conference on Neural Information Processing, Springer, pp 410-417, which are incorporated herein by reference). In general, it can be useful if the phase portion is used cautiously. (See, Günther M, Haufe D, Würtz R P (2012) *Face recognition with disparity corrected gabor phase di☐erences*. In: International Conference on Artificial Neural Networks, Springer, pp 411-418, which is incorporated herein by reference).

A unichrome feature is a fusion of a complex Gabor response that is computed over all spectral bands. (See, Jain A, Healey G (1998) *A multiscale representation including opponent color features for texture recognition*. IEEE Transactions on Image Processing 7(1):124-128, which is incorporated herein by reference). The unichrome feature represents the overall energy of the spectral information captured by the Gabor filter-bank. Another feature, an opponent feature, can be computed from Gabor spectral bands at multi-scale levels. (See, Jain A, Healey G (1998) *A multiscale representation including opponent color features for texture recognition*. IEEE Transactions on Image Processing 7(1):124-128, which is incorporated herein by reference). Opponent features are the di☐erences in responses between two di☐erent filters. (See, Rajadell O, Garcia-Sevilla P, Pla F (2012) *Spectral-spatial pixel characterization using gabor filters for hyperspectral image classification*. IEEE Geoscience and Remote Sensing Letters 10(4):860-864, which is incorporated herein by reference). In some implementations, the fusion of spectral and spatial features is studied using convolutions neural networks (CNN). The benefit of multi-staged decomposition of features (i.e., images) in a convolution neural network (CNN) is discussed in detail below.

Some implementations can include integration of spatial and spectral information computed using a Gabor transformation. Then, the CNN is used to derive sign classes. Some implementations can include multi-view image information for improved robustness.

CNN Model

Figure 4:
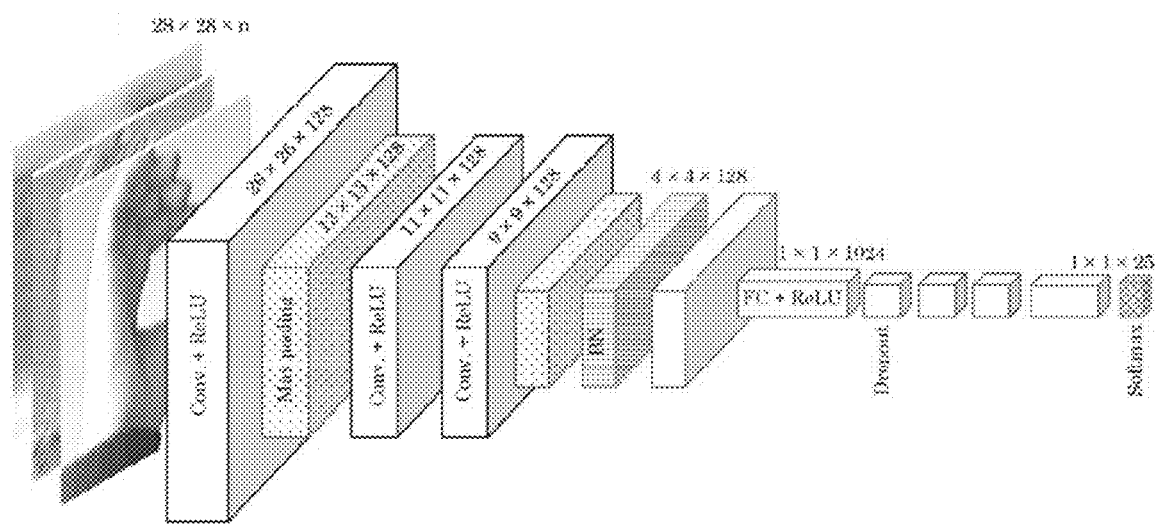
FIG. 4 is a diagram of an exemplary architecture of an exemplary CNN model with an input layer size of 28×28×n, where 1≤n≤17, in accordance with some implementations.

In some implementations, a CNN model is used to recognize sign language alphabets. The architecture of an exemplary model is shown in FIG. 4. More specifically, FIG. 4 shows a diagram of an exemplary architecture of an exemplary CNN model with an input layer size of 28×28×n, where $1 \leq n \leq 17$ in accordance with some implementations. In FIG. 4, BN means Batch Normalization and FC means Fully Connected. In some implementations, the spectral features that are extracted using Gabor filtering are used as input to this CNN model. These features may be fed to the model individually or in concatenation with spatial information. In some implementations, the CNN model may comprise 11 layers and the loss of the model may be computed using a Softmax loss function, which represents categorical distribution over various output classes. In some implementations, the model's components include:

Input

In some implementations, two representations of hand gesture images are used as input to the CNN model: hand gesture images (e.g., raw images containing a plurality of pixels, where raw refers to unprocessed images) and their spectral features extracted using a Gabor filter bank. Each one of these inputs is fed into the CNN model individually or in concatenation with the other input representations. In some implementations, the method or system performs operation to recognize a sign based on input generated using a fusion technique to concatenate raw/unprocessed image pixels with Gabor responses that are extracted from the raw/unprocessed images. In some implementations, the CNN model is first used to extract the features and classify the hand gestures images. Raw/unprocessed images with large dimensions are normalized into a size of 28×28 to form an input layer with size 28×28×1 and are fed into the CNN model. To improve accuracy, the model is trained on di☐erent variations of the used datasets in some implementations. These variations may, for example, involve cropping the hand gesture images and adding noises to the said images.

The results include four sets of each dataset: raw/unprocessed, cropped, noisy, and cropped/noisy images. In some other implementations, a CNN model is used to classify the Gabor responses that are extracted from the original images. In some implementations, the Gabor technique is used for feature extraction and the CNN is used for classification. Single and multi-orientation Gabor responses are extracted and used as input to the CNN model. In some implementations, the scale and orientation of each Gabor response forms one layer of the input layers with 28×28×1 dimensions (28×28 dimensions of the input responses and 1 channel) while multi-orientation Gabor responses form an input layer with 28×28×16 dimensions (16=4×4, i.e., four scales and four orientations). A concatenation of hand gesture images and Gabor responses is used as input to the CNN model in some implementations. Di☐erent concatenation scenarios may be followed, starting with the formation of two input layers and ending with the formation of an input with 17 layers, where each of the 17 layers represents one input representation.

Convolution Layers

In some implementations, the first CNN layer filters a 28×28×n input image (where n is the number of channels) with 128 kernels of size 5×5 and a stride of 1 pixel, and outputs 128 feature maps with the size of 26×26. Each convolution layer in this model is followed by an ReLU activation function, which is a nonlinear operator that outputs zero if the input to this function is negative. ReLU is computationally powerful and reduces the likelihood of the gradient vanishing, which makes the gradient propagation more efficient. (See, Chen Y, Zhu L, Ghamisi P, Jia X, Li G, Tang L (2017) *Hyperspectral images classification with gabor filtering and convolutional neural network*. IEEE Geoscience and Remote Sensing Letters 14(12):2355-2359, which is incorporated herein by reference). In some implementations, the output of this layer is subsampled with a 2×2 max-pooling window, which uses a stride of 2 pixels. This outputs 128 feature maps with a size of 13×13. This output may subsequently be used as input into another convolution layer, followed by further max-pooling subsampling, to eventually output 128 feature maps with size 11×11.

Batch Normalization and Dropout

To improve the accuracy of the CNN model and reduce overfitting, batch normalization and dropout layers are used in some implementations. Batch normalization undertakes the normalization part of the architecture by normalizing the layer's inputs using the mean and variance of the values in the minibatch. (See, Ioffe S, Szegedy C (2015) *Batch normalization: Accelerating deep network training by reducing internal covariate shift*. arXiv preprint arXiv: 150203167, which is incorporated herein by reference). Normalization speeds up the training process and mitigates the issue of improper weights initialization. A dropout layer may be used to alleviate the problem of overfitting resulting from small datasets. (See, Hinton G E, Srivastava N, Krizhevsky A, Sutskever I, Salakhutdinov R R (2012) *Improving neural networks by preventing co-adaptation of feature detectors*. arXiv preprint arXiv:12070580, which is incorporated herein by reference).

Fully Connected (FC) Layers

In some implementations, feature maps generated from convolution layers are used as input into two FC layers. The first FC layer consists of 1024 neurons followed by an ReLU activation function for non-linearity and dropout layers to prevent overfitting. The second FC layer consists of a number of neurons corresponding to the number of classes of the used database, e.g., 25 classes for MNIST and 32 classes for ArSL. The latter FC layer is followed by a Softmax classifier to determine the corresponding class label for the current sign. If x is used to refer to the input image and y represents its class label, then the model is represented by a function $f_\theta$: X→C=1, . . . , n, where θ is the model parameter, X is the input domain, and C is the set of classes. The loss function is defined by the cross-entropy between the predicted class and the true class as follows, $$\mathcal{L}(x,y)=\delta(\phi(f_\theta(x)),\varphi(y)) \quad (4)$$

where $\phi(z)=\ldots,\varphi(y)=[0, 0, \ldots, 1, \ldots, 0, 0]^T$ is a one-hot encoding column vector, and $\delta(a,b)=-b^T \log(a)$.

Sign Language Datasets

Figure 5A:
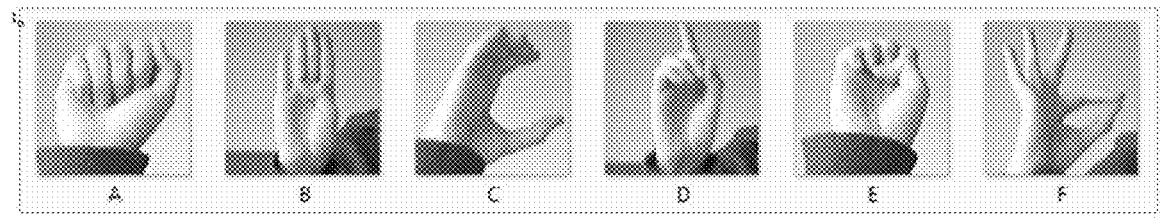
FIGS. 5A-5C show example signs from: (a) MNIST ASL database (FIG. 5A), (b) ArSL database (FIG. 5B), and (c) MUASL database (FIG. 5C) in accordance with some implementations.
Figure 5B:
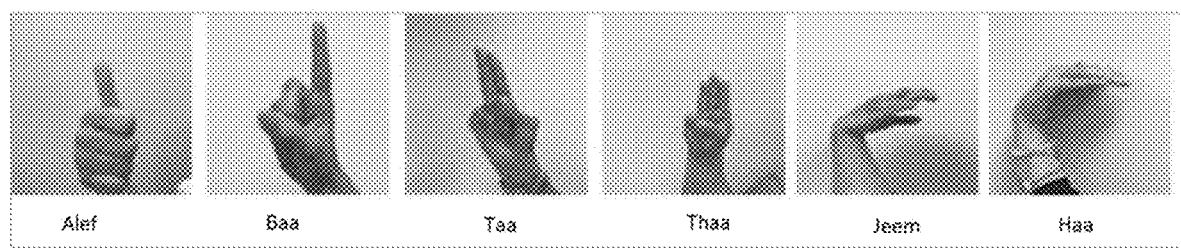
Figure 5C:
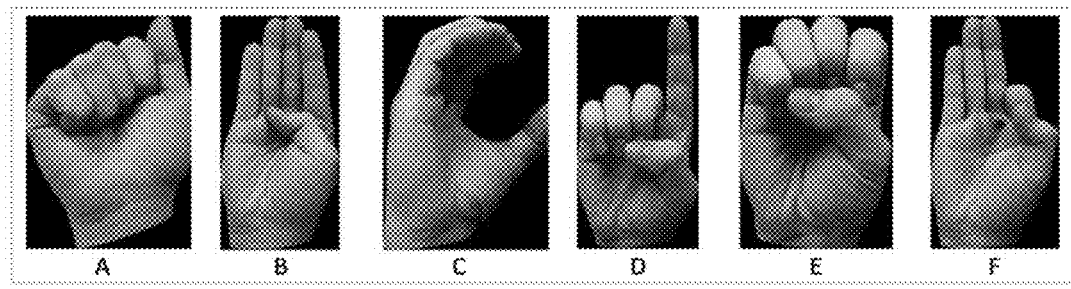

An example computerized sign language hand gesture (e.g., visual hand gesture) recognition system/method was evaluated using three sign language datasets, namely the American MNIST replacement sign language alphabet, the Arabic sign language alphabet (ArSL), and the Massey University ASL dataset (MUASL). FIG. 5 shows example signs from: (a) a MNIST ASL database (FIG. 5A), (b) an ArSL database (FIG. 5B), and (c) an MUASL database (FIG. 5C) in accordance with some implementations.

A) MNIST: This dataset is a drop-in replacement for the original ASL database. (See, Pugeault N, Bowden R (2011) *Spelling it out: Real-time asl fingerspelling recognition*. In: 2011 IEEE International conference on computer vision workshops (ICCV workshops), IEEE, pp 1114-1119, which is incorporated herein by reference). The dataset was created using ImageMagick software to crop, re-size, and convert grayscales in samples, and to increase per-class samples with more than 50 variations. (See, *An image editing tool*. URL: https://imagemagickorg/script/downloadphpwindows, which is incorporated herein by reference). Moreover, the modifications incorporate filters such as Mitchell, Hermite, and Catrom. Furthermore, 5% random pixelation, ±15% brightness/contrast, and image rotation with three degrees have been used in the modifications to generate more than 50 variations.

The MNIST dataset consists of 34,627 grayscale images with 28×28 resolution of 24 letters, which comprise all ASL letters, excluding signs that require motion (e.g., J and Z). The database was split into 27,455 samples (about 80%) for training and the remaining 7,172 samples (about 20%) for testing in some implementations. (See, *Mnist sign language database*. URL: https://wwwkagglecom/datamunge/sign-language-mnist, which is incorporated herein by reference). FIG. 5A shows samples taken from an exemplary MNIST database for letters 'A' through 'F' of English in accordance with some implementations.

B) ArSL: In some implementations, this dataset has 32 gestures and is more challenging than the MNIST dataset because of the intra-variations per each alphabet class. (See, Ghazanfar L, Jaafar A, Nazeeruddin M, Roaa A, Rawan A (2018) *Arabic alphabets sign language dataset (arasl)*. URL:https://datamendeleycom/datasets/y7pckrw6z2/1, which is incorporated herein by reference). It consists of 54,049 images of ArSL alphabets performed by 40 signers. The number of samples per class is different in this dataset (i.e., an imbalanced dataset). FIG. 5B shows samples taken from an exemplary ArSL dataset for six Arabic letters pronounced as 'Alef', 'Baa', 'Taa', 'Thaa', 'Jeem', and 'Haa' in accordance with some implementations.

C) MUASL: This is another version of the ASL database but contains different signs and includes both digits and alphabets. (See, Barczak A, Reyes N, Abastillas M, Piccio A, Susnjak T (2011) *A new 2d static hand gesture colour image dataset for asl gestures*, which is incorporated herein by reference). The database was performed by five individuals and consists of 36 gestures (10 digits and 26 alphabets) with a total of 2,425 color images in some implementations. This database has variations in scale, rotation, and illumination directions (top, bottom, left, right, and diffused). FIG. 5C shows samples taken from an exemplary MUASL dataset for letters 'A' through 'F' in accordance with some implementations.

In some implementations, to enrich the abovementioned datasets and evaluate the accuracy of the exemplary system/method on different variations of the original images, three datasets are formed by cropping and adding noises to the MINIST and the ArSL datasets. The first dataset is formed by cropping the hand gesture images in five directions: left-down, left-up, right-down, right-up, and center (as illustrated in FIG. 6). Training the model of the exemplary method/system on cropped images helps improve the model's accuracy in recognizing partially destroyed or overlapped images. The second dataset is formed by adding two forms of noise (e.g., salt-and-pepper and Gaussian noises) to the images of each database. Adding noises to the datasets helps in evaluating the robustness of the proposed method/system against noisy sign images. The noise addition also helps in regularizing and reducing overfitting, especially with small datasets.

Figure 6A:
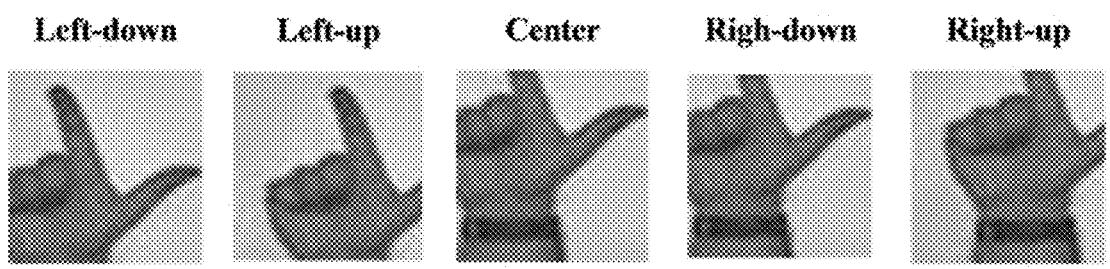
FIGS. 6A-6C show the 'Laam' letter of an ArSL database with example cropping and sample noises in accordance with some implementations.
Figure 6B:
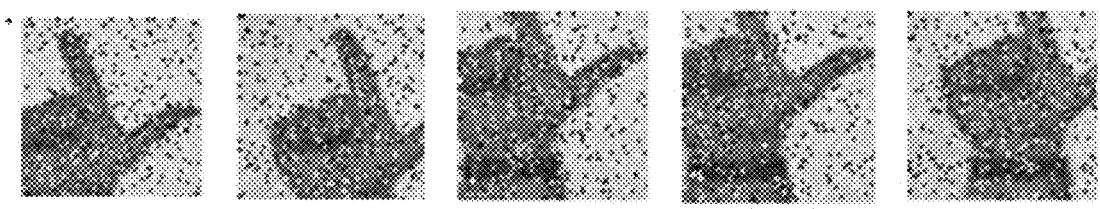
Figure 6C:
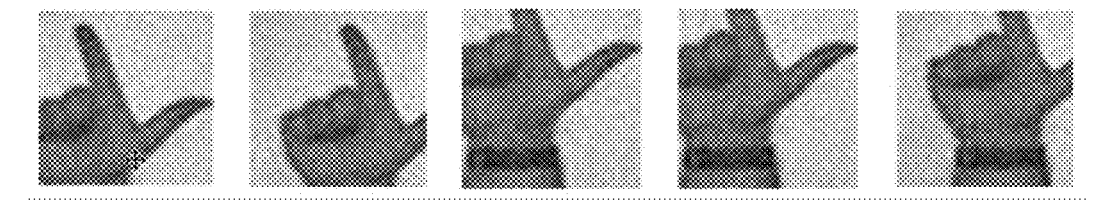

The third dataset is a more challenging dataset, where two operations are applied to the hand gesture images. In some implementations, this dataset is generated by applying noises to the cropped images of each dataset. Samples of the ArSL database with cropping and noises are shown in FIG. 6. In particular, FIG. 6 shows the 'Laam' letter of an ArSL database with example cropping and sample noises—(a) Cropped images (FIG. 6A), (b) Cropped images with Salt-and-pepper noise (FIG. 6B), (c) Cropped images with Gaussian noise (FIG. 6C) in accordance with some implementations.

Classification Models

A) SVM Classifier: In some implementations, a Gabor filter bank is used to extract spectral features from hand gesture images. These features are then fed to an SVM classifier for classification, which is the baseline for efficiency comparisons with a CNN-based model. SVM is a discriminative classifier that creates a hyperplane to separate the data into classes. In some implementations, the C-Support Vector Classification (SVC) algorithm of SVM was used. (See, Boser B E, Guyon I M, Vapnik V N (1992) *A training algorithm for optimal margin classifiers*. In: Proceedings of the fifth annual workshop on Computational learning theory, ACM, pp 144-152; and Cortes C, Vapnik V (1995) Support-vector networks. Machine learning 20(3): 273-297, which are incorporated herein by reference). In some implementations, a non-linear model of SVC was used to evaluate the accuracy of this model on raw/unprocessed sign images. An accuracy of 97.1% using default parameters on validation data of MNIST dataset was noted in some implementations.

SVC algorithms may be sensitive to chosen parameters—this may justify the accuracy obtained with default settings. In some implementations, to improve the accuracy of an SVC algorithm, hyperparameter tuning is used to choose optimal values of the C and the Gamma parameters. A 5-fold cross-validation is used in some implementations to tune the model and change the C value to be 7 or 15 and the Gamma value to be in the range of 0.01 to 0.0001. The optimal combination of C and Gamma values is 15 and 0.01 respectively as these values provide the highest validation accuracy while avoiding overfitting in some implementations. This hyperparameter tuning improved the accuracy of the non-linear SVM model to 99.7%.

B) CNN Models: In some implementations, a CNN based model consisting of 11 layers followed by a Softmax classifier is used. The convolution layers were followed by an ReLU activation function, max-pooling, batch normalization, dropout, and fully connected layers. The number and size of kernels used in a CNN model have an effect on the accuracy of the model in some implementations. In some implementations, a kernel with size of 5×5 is chosen after experimenting with different values. In addition, the accuracy of the CNN based model is evaluated in some implementations using different numbers and/or sizes of kernels.

Figure 7:
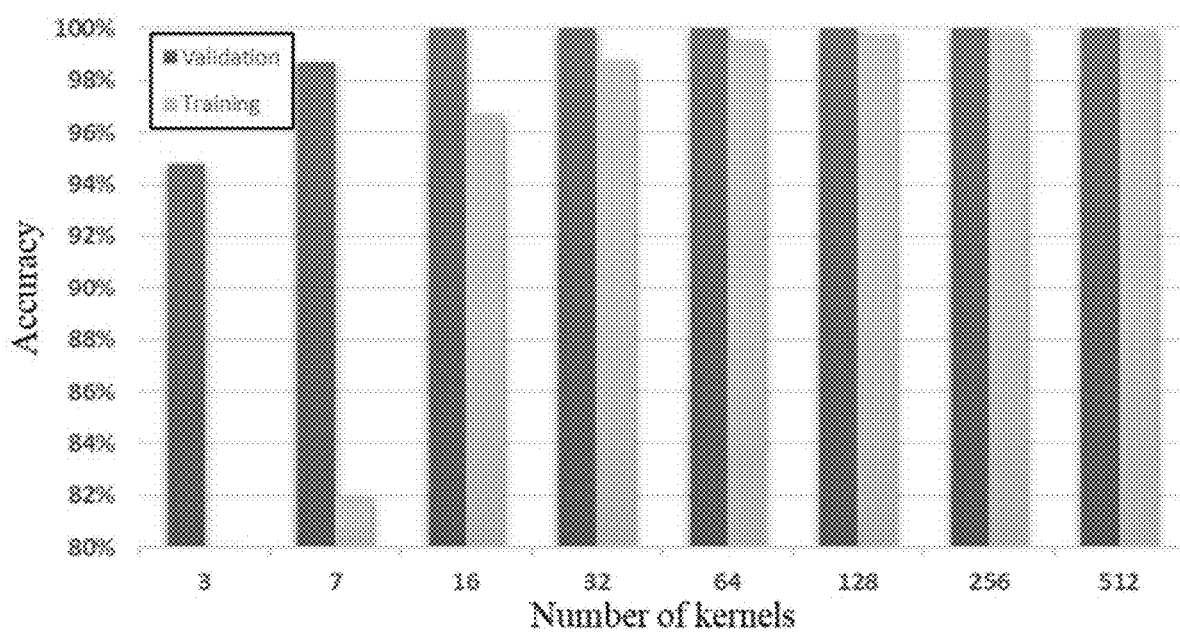
FIG. 7 is an example graph showing percentage accuracy of an exemplary CNN model with di☐erent number of kernels in accordance with some implementations.

FIG. 7 is an example graph showing percentage accuracy of an exemplary CNN model with different number of kernels in accordance with some implementations. As shown in FIG. 7, in some implementations, the optimal accuracy is obtained with 128 kernels and no further significant improvement is noticed with a larger number of kernels. To avoid overfitting that may result from using too many epochs during model training or to avoid underfitting that may result from using too few a number of epochs, an early stopping technique is applied during model training in some implementations. This technique stops model training once the model performance stops improving significantly for a while on a hold-out validation dataset.

In some implementations, the CNN based model was evaluated on various scenarios of input data to explore its effectiveness for domain-specific information. This information was extracted from spatial and Gabor transformed images in some implementations. In some implementations, four Gabor responses (e.g., imaginary, phase, magnitude, and real) were extracted from the hand gesture images and fed to the CNN based model for classification. In some implementations, several experiments were conducted to evaluate the efficiency of integrating Gabor filtering with a CNN as compared to the baseline SVM classifier.

TABLE 1

Performance of SVM and CNN models on raw, cropped, and noisy datasets

| | | MNIST | | | | ArSL | | | |
|---|---|---|---|---|---|---|---|---|---|
| Input | Model | Acc | Prc | Rec | F1 | Acc | Prc | Rec | F1 |
| Raw | SVM | 0.831 | 0.816 | 0.820 | 0.813 | 0.8835 ± 0.0017 | 0.8836 ± 0.0017 | 0.8853 ± 0.0017 | 0.8830 ± 0.0017 |
| | CNN | 0.982 | 0.980 | 0.980 | 0.980 | 0.9843 ± 0.0004 | 0.9836 ± 0.0004 | 0.9842 ± 0.0004 | 0.9832 ± 0.0004 |
| Cropped | SVM | 0.779 | 0.759 | 0.760 | 0.768 | 0.8676 ± 0.001 | 0.8678 ± 0.001 | 0.8698 ± 0.0009 | 0.8668 ± 0.001 |
| | CNN | 0.992 | 0.990 | 0.990 | 0.990 | 0.8766 ± 0.0283 | 0.8668 ± 0.0289 | 0.9083 ± 0.0165 | 0.8213 ± 0.0296 |
| Noisy | SVM | 0.784 | 0.769 | 0.773 | 0.766 | 0.8124 ± 0.008 | 0.8167 ± 0.0008 | 0.8192 ± 0.0009 | 0.8156 ± 0.0008 |
| | CNN | 0.984 | 0.980 | 0.989 | 0.980 | 0.9801 ± 0.0005 | 0.9796 ± 0.0005 | 0.9804 ± 0.0006 | 0.9701 ± 0.0005 |
| Cropped + Noisy | SVM | 0.676 | 0.657 | 0.666 | 0.657 | 0.6903 ± 0.0005 | 0.6903 ± 0.0004 | 0.694 ± 0.0005 | 0.6887 ± 0.0005 |
| | CNN | 0.986 | 0.980 | 0.980 | 0.980 | 0.9408 ± 0.0026 | 0.9896 ± 0.0027 | 0.946 ± 0.0024 | 0.9361 ± 0.0028 |

Table 1 shows results obtained using SVM and CNN with raw/unprocessed, cropped, and noisy images. The performance is evaluated in terms of Accuracy (Acc), Precision (Prc), Recall (Rec), and F1 score in some implementations. In the experiments, raw/unprocessed pixel values are fed into SVM and CNN. As shown in the table, the CNN based model outperformed the SVM based model on both MNIST and ArSL databases. Also, accuracy of CNN does not degrade with cropped and noisy images, thereby demonstrating the robustness of the disclosed model. In contrast, accuracy of SVM reduced sharply with cropped and noisy images. This may be attributed to the efficiency of CNN in extracting and learning more appropriate discriminative features from sign images compared to SVM. (See, Wang H, Raj B (2017) *On the origin of deep learning.* arXiv preprint arXiv:170207800, which is incorporated herein by reference).

TABLE 2

Performance of SVM and CNN models with single scale and orientation Gabor responses (I: Imaginary, P: Phase, M: Magnitude)

| | | MNIST | | | | ArSL | | | |
|---|---|---|---|---|---|---|---|---|---|
| Input | Model | Acc | Pre | Rec | $F_1$ | Acc | Pre | Rec | $F_1$ |
| Imaginary | SVM | 0.852 | 0.84 | 0.85 | 0.84 | 0.7043 ± 0.0026 | 0.7046 ± 0.0025 | 0.7132 ± 0.0024 | 0.7024 ± 0.0026 |
| | CNN | 0.982 | 0.98 | 0.98 | 0.98 | 0.923 ± 0.001 | 0.923 ± 0.001 | 0.928 ± 0.001 | 0.920 ± 0.001 |
| Phase | SVM | 0.80 | 0.80 | 0.80 | 0.79 | 0.5691 ± 0.8026 | 0.5698 ± 0.0026 | 0.5821 ± 0.0028 | 0.5667 ± 0.0025 |
| | CNN | 0.992 | 0.99 | 0.99 | 0.99 | 0.798 ± 0.012 | 0.784 ± 0.012 | 0.824 ± 0.008 | 0.765 ± 0.014 |
| Real | SVM | 0.874 | 086 | 0.87 | 0.86 | 0.7206 ± 0.0024 | 0.7298 ± 0.0025 | 0.7276 ± 0.0026 | 0.719 ± 0.0026 |
| | CNN | 0.973 | 0.97 | 0.97 | 0.97 | 0.942 ± 0.001 | 0.941 ± 0.001 | 0.945 ± 0.001 | 0.939 ± 0.001 |
| Magnitude | SVM | 0.873 | 0.86 | 0.87 | 0.86 | 0.8349 ± 0.002 | 0.8340 ± 0.0021 | 0.8377 ± 0.002 | 0.8337 ± 0.0021 |
| | CNN | 0.989 | 0.99 | 0.99 | 0.99 | 0.9332 ± 0.0007 | 0.9321 ± 0.0007 | 0.9373 ± 0.0006 | 0.9295 ± 0.0007 |
| I + P | CNN | 0.991 | 0.99 | 0.99 | 0.99 | 0.8385 ± 0.0108 | 0.8338 ± 0.0108 | 0.8559 ± 0.0082 | 0.8244 ± 0.0117 |
| I + R | CNN | 0.984 | 0.98 | 0.98 | 0.98 | 0.9558 ± 0.0011 | 0.9553 ± 0.001 | 0.9567 ± 0.001 | 0.9549 ± 0.0011 |
| I + M | CNN | 0.989 | 0.99 | 0.99 | 0.99 | 0.9504 ± 0.0013 | 0.9496 ± 0.0013 | 0.9515 ± 0.0012 | 0.949 ± 0.0013 |
| P + R | CNN | 0.983 | 0.99 | 0.98 | 0.98 | 0.9010 ± 0.0057 | 0.8975 ± 0.0056 | 0.9051± 0.0049 | 0.8946 ± 0.0062 |
| P + M | CNN | 0.978 | 0.98 | 0.98 | 0.98 | 0.8995 ± 0.0047 | 0.896 ± 0.0049 | 0.904 ± 0.0043 | 0.8926 ± 0.0051 |
| R + M | CNN | 0.98 | 0.98 | 0.98 | 0.98 | 0.9412 ± 0.0008 | 0.9404 ± 0.0008 | 0.944 ± 0.0008 | 0.9387 ± 0.0009 |
| I + P + R | CNN | 0.991 | 0.99 | 0.99 | 0.99 | 0.9308 ± 0.0045 | 0.9291 ± 0.0047 | 0.9326 ± 0.0041 | 0.9281 ± 0.0048 |
| I + P + M | CNN | 0.978 | 0.98 | 0.98 | 0.98 | 0.0302 ± 0.0029 | 0.9286 ± 0.0032 | 0.9321 ± 0.0027 | 0.9272 ± 0.0033 |
| I + R + M | CNN | 0.99 | 0.99 | 0.99 | 0.99 | 0.9556 ± 0.0013 | 0.9551 ± 0.0013 | 0.9565 ± 0.0011 | 0.9546 ± 0.0014 |
| P + R + M | CNN | 0.987 | 0.99 | 0.98 | 0.98 | 0.9144 ± 0.0035 | 0.9109 ± 0.005 | 0.9162 ± 0.0045 | 0.9089 ± 0.0052 |
| I + P + R + M | CNN | 0.982 | 0.98 | 0.98 | 0.98 | 0.936 ± 0.0033 | 0.9346± 0.0034 | 0.9376 ± 0.003 | 0.9335 ± 0.0035 |

In some implementations, further experiments were conducted using SVM and CNN on spectral features extracted from sign images using Gabor filtering for both single and multi-orientation cases. Each Gabor response is used as an input to the CNN based model, either individually or in concatenation with other responses, in some of the implementations.

1. Single scale and orientation Gabor response: Gabor filter with single scale and orientation is applied to hand gesture images and imaginary, phase, magnitude, and real responses are extracted from each image in some implementations. These responses are classified into their corresponding labels using SVM and CNN and the obtained results are shown in Table 2. For CNN, various combinations of responses were used in some of the implementations. As shown in the table, the highest accuracy with single-channel input is obtained using a CNN based model compared to an SVM classifier. The CNN based model attained an accuracy of 0.992 using a phase response with an MNIST dataset and an accuracy of 0.942±0.001 using a real response with an ArSL dataset in some implementations.

Giving that CNN outperformed SVM on both raw/unprocessed images and Gabor responses, the experiments of CNN were extended in some implementations by combining more than one response to form a multi-channel input layer to a CNN, where each channel corresponds to one response. Firstly, a two-channel input layer is formed by combing two responses and the obtained results are shown in Table 2. From these results, concatenating phase responses with other responses using an MNIST dataset does not improve the accuracy of the model, while concatenating real responses with imaginary responses improves the accuracy of the model by about 1.4% with an ArSL database. In some implementations, further experiments were conducted by forming an input layer consisting of three responses, while this improved the accuracy of CNN using ArSL to 0.9556, no significant improvement was observed on the MNIST database. In contrast, in some implementations, combining all four responses (I+P+R+M) did not lead to additional improvement in the accuracy of the CNN based model and this result may be attributable to the e☐ect of using responses with low discriminative ability.

2. Multi-scale and multi-orientation Gabor filter: In some implementations, all Gabor responses extracted from hand gesture images are extracted using a Gabor filter with single scale and orientation. In some implementations, the spectral features are extracted using Gabor filtering with four scales and four orientations to form an input layer of size 28×28×16 (16:4 scales×4 orientations).

TABLE 3

Performance of CNN models with mutli-scale and multi-orientation Gabor responses

| Input | MINST | | | | ArSL | | | |
| --- | --- | --- | --- | --- | --- | --- | --- | --- |
| | Acc | Pre | Rec | $F_1$ | Acc | Pre | Rec | $F_1$ |
| Imaginary | 0.991 | 0.99 | 0.99 | 0.99 | 0.9506 ± 0.0011 | 0.9501 ± 0.0012 | 0.0953 ± 0.001 | 0.9486 ± 0.0013 |
| Phase | 0.573 | 0.85 | 0.57 | 0.61 | 0.9249 ± 0.0109 | 0.9238 ± 0.0108 | 0.933 ± 0.0073 | 0.923 ± 0.0111 |
| Real | 0.980 | 0.98 | 0.97 | 0.97 | 0.9533 ± 0.0009 | 0.9528 ± 0.0009 | 0.995 ± 0.0008 | 0.9516 ± 0.001 |
| Magnitude | 0.994 | 0.99 | 0.99 | 0.98 | 0.9518 ± 0.0012 | 0.9512 ± 0.0013 | 0.9536 ± 0.0012 | 0.9499 ± 0.0013 |

Table 3 shows the results of using CNN for classifying the features extracted using a multi-scale and multi-orientation Gabor filter from sign images in some implementations. In comparison with a single scale and orientation Gabor, the accuracy of CNN using magnitude response with the MNIST database improved by 0.023 and outperformed the other response types. The big improvement in accuracy with ArSL database is with phase responses, which improved by 0.13 over a single scale and orientation Gabor filter in some implementations.

3. Raw/unprocessed image with Gabor responses: To evaluate the performance of CNN on raw/unprocessed images with spectral features, hand gesture images were concatenated with Gabor responses in some implementations. The images with Gabor responses extracted from single and multi-scale and orientation Gabor filters were concatenated in some implementations. Firstly, a raw/unprocessed image is concatenated with Gabor responses extracted using a single scale and orientation Gabor filter. In some implementations, an input layer to the CNN model consisting of two, three, and four channels is formed, where each channel represents either a raw/unprocessed image or a Gabor response. The results of the aforementioned experiment are shown in Table 4.

TABLE 4

Performance of CNN model using raw/unprocessed images concatgenatged with Gabor responses (Img: Image, I: Imaginary, P: Phase, M: Magnitude)

| Input | θ | MINST | | | | ArSL | | | |
| --- | --- | --- | --- | --- | --- | --- | --- | --- | --- |
| | | Acc | Pre | Rec | $F_1$ | Acc | Pre | Rec | $F_1$ |
| Img + I | 1 | 0.958 | 0.96 | 0.96 | 0.96 | 0.986 ± 0.001 | 0.985 ± 0.001 | 0.986 ± 0.001 | 0.985 ± 0.001 |
| Img + P | 1 | 0.981 | 0.98 | 0.98 | 0.98 | 0.968 ± 0.001 | 0.967 ± 0.001 | 0.969 ± 0.001 | 0.967 ± 0.001 |
| Img + R | 1 | 0.979 | 0.98 | 0.98 | 0.98 | 0.9862 ± 0.0004 | 0.9855 ± 0.0005 | 0.9861 ± 0.0005 | 0.9851 ± 0.0006 |
| Img + M | 1 | 0.981 | 0.98 | 0.98 | 0.98 | 0.9860 ± 0.0005 | 0.9853 ± 0.0005 | 0.986 ± 0.0005 | 0.9849 ± 0.0005 |
| Img + I + P | 1 | 0.962 | 0.96 | 0.96 | 0.96 | 0.9731 ± 0.0017 | 0.9722 ± 0.0017 | 0.9734 ± 0.0016 | 0.9715 ± 0.0017 |
| Img + I + M | 1 | 0.978 | 0.98 | 0.98 | 0.97 | 0.9906 ± 0.0004 | 0.99 ± 0.0004 | 0.9904 ± 0.0004 | 0.9897 ± 0.0005 |
| Img + I + R | 1 | 0.987 | 0.99 | 0.99 | 0.99 | 0.9808 ± 0.0004 | 0.9894 ± 0.0005 | 0.9897 ± 0.0004 | 0.9892 ± 0.0005 |
| Img + P + R | 1 | 0.981 | 0.98 | 0.98 | 0.98 | 0.9318 ± 0.0959 | 0.9291 ± 0.0995 | 0.9298 ± 0.0997 | 0.9302 ± 0.0965 |
| Img + P + M | 1 | 0.972 | 0.97 | 0.97 | 0.97 | 0.9771 ± 0.0024 | 0.9762 ± 0.0024 | 0.9771 ± 0.0022 | 0.9757 ± 0.0024 |
| Img + P + R + M | 1 | 0.087 | 0.99 | 0.99 | 0.99 | 0.9814 ± 0.0013 | 0.9807 ± 0.0013 | 0.9814 ± 0.0013 | 0.9804 ± 0.0012 |
| Img + I | 4 | 0.992 | 0.99 | 0.99 | 0.99 | 0.9785 ± 0.0012 | 0.9744 ± 0.0013 | 0.9749 ± 0.0012 | 0.9743 ± 0.0013 |
| Img + P | 4 | 0.992 | 0.99 | 0.99 | 0.99 | 0.914 ± 0.0156 | 0.9126 ± 0.0159 | 0.9271 ± 0.0099 | 0.9114 ± 0.0161 |
| Img + R | 4 | 0.99 | 0.99 | 0.99 | 0.99 | 0.972 ± 0.0013 | 0.9708 ± 0.0013 | 0.9714 ± 0.0012 | 0.9707 ± 0.0014 |
| Img + M | 4 | 0.999 | 0.999 | 0.999 | 0.999 | 0.975 ± 0.001 | 0.9741 ± 0.0009 | 0.9746 ± 0.0009 | 0.974 ± 0.0009 |

As shown in the table, concatenating raw/unprocessed images with single scale and orientation responses does not improve the accuracy of CNN with the MNIST database in some implementations. In contrast, a big improvement is observed when raw/unprocessed images of ArSL database are concatenated with imaginary and magnitude responses—accuracy increased from 0.9504±0.0013 to 0.9905±0.0004. Secondly, an input layer to the CNN is formed in some implementations with size 28×28×17, where the 17 channels are concatenation of a raw/unprocessed image channel with 16 channels representing Gabor responses (extracted with four scales and four orientations).

As shown in Table 4, the best accuracies, 0.999 and 0.975±0.001, are obtained with MNIST and ArSL databases respectively when concatenating raw/unprocessed images with magnitude responses. Based on the results shown in Tables 1-4, CNN is more efficient for recognizing sign language alphabets compared to SVM. In some implementations, concatenating raw/unprocessed images with responses extracted from Gabor filtering improved the accuracy of CNN to 0.999 and 0.9905±0.0004 on MNIST and ArSL databases respectively.

Comparisons

In some implementations, to benchmark the efficiency of an exemplary method and system, the results from the exemplary method and system were compared with the state-of-the-art techniques for the MNIST and MUASL databases but no comparison was performed for the ArSL database as this database was published in 2019 and no earlier work has been reported. The comparisons with existing state-of-the-art techniques are shown in Table 5.

TABLE 5

Comparison with other existing techniques for the benchmark database (— means not available)

| Database | Method | Gestures | Accuracy (%) Dependent | Accuracy (%) Independent |
|---|---|---|---|---|
| ArSL | Existing methods (none) | 32 | — | — |
|  | Proposed CNN model | 32 | 99.05 | — |
| MNIST | Rathi [41] | 24 | 95.03 |  |
|  | Chakraborty et al. [11] | 24 | 95.30 | — |
|  | Proposed CNN method | 24 | 99.90 | — |
| MUASL | 2D-ZMs [6] | 10 | 98.51 | — |
|  | CNN [39] | 24 | 97.01 | 76.25 |
|  | CNN [8] | 26 | 82.50 | — |
|  | Multi-features [34] | 36 | 94.00 | — |
|  | Proposed CNN method | 10 | 99.90 ± 0.19 | 93.20 |
|  | Proposed CNN method | 24 | 99.09 ± 0.24 | 87.60 |
|  | Proposed CNN method | 26 | 98.44 ± 0.34 | 88.30 |
|  | Proposed CNN method | 36 | 97.03 ± 0.32 | 81.70 |

For example, the results of an exemplary method were compared with result from a study by Rathi and Chakraborty et al. for a MNIST database using the same 24 signs. (See, Rathi D (2018) *Optimization of transfer learning for sign language recognition targeting mobile platform*. arXiv preprint arXiv:180506618; and Chakraborty D, Garg D, Ghosh A, Chan J H (2018) *Trigger detection system for American sign language using deep convolutional neural networks*. In: Proceedings of the 10th International Conference on Advances in Information Technology, ACM, p 4, which is incorporated herein by reference). Rathi employed transfer learning to recognize the ASL alphabets while Chakraborty et al. used a CNN model. (See, Rathi D (2018) *Optimization of transfer learning for sign language recognition targeting mobile platform*. arXiv preprint arXiv:180506618; and Chakraborty D, Garg D, Ghosh A, Chan J H (2018) *Trigger detection system for American sign language using deep convolutional neural networks*. In: Proceedings of the 10th International Conference on Advances in Information Technology, ACM, p 4, which are incorporated herein by reference). As shown in the table, the exemplary method outperformed the other two methods in this case.

In some implementations, the results of an exemplary method were compared with existing techniques/models for another benchmarking ASL database, namely the MUASL database. (See, Barczak A, Reyes N, Abastillas M, Piccio A, Susnjak T (2011) *A new 2d static hand gesture colour image dataset for asl gestures*, which is incorporated herein by reference). This database is performed by five individuals and consists of 36 gestures for 10 digits and 26 alphabets, with a total of 2425 color images. The database contains variations in illumination, scale, and orientation.

The entire database is used by some techniques/models, while other techniques/models used only a part of the database. (See, Pan T Y, Lo L Y, Yeh C W, Li J W, Liu H T, Hu M C (2016) *Real-time sign language recognition in complex background scene based on a hierarchical clustering classification method*. In: 2016 IEEE Second International Conference on Multimedia Big Data (BigMM), IEEE, pp 64-67; Chevtchenko S F, Vale R F, Macario V (2018) *Multi-objective optimization for hand posture recognition*. Expert Systems with Applications 92:170-181; Bheda V, Radpour D (2017) *Using deep convolutional networks for gesture recognition in american sign language*. arXiv preprint arXiv:171006836; Ranga V, Yadav N, Garg P (2018) *American sign language fingerspelling using hybrid discrete wavelet transform-gabor filter and convolutional neural network*. Journal of Engineering Science and Technology 13(9):2655-2669; and Aowal M A, Zaman A S, Rahman S M, Hatzinakos D (2014) *Static hand gesture recognition using discriminative 2d zernike moments*. In: TENCON 2014-2014 IEEE Region 10 Conference, IEEE, pp 1-5, which are incorporated herein by reference).

To be consistent with other techniques and models, in some implementations, the comparisons used the same number of gestures reported by each technique/model involved in the comparison. In some implementations, the training and testing data was divided into dependent and independent datasets. A dependent dataset splits the entire dataset after shuffling it into training (80%) and testing (20%) data. An independent dataset uses the gestures of four signers for training while the fifth signer is used for testing. For example, only one study reported its results on both datasets while other studies reported their results only on the dependent dataset. (See, Ranga V, Yadav N, Garg P (2018) *American sign language fingerspelling using hybrid discrete wavelet transform-gabor filter and convolutional neural network*. Journal of Engineering Science and Technology 13(9):2655-2669, which is incorporated herein by reference). The exemplary method/system is performed/implemented on both data sets.

Figure 10:
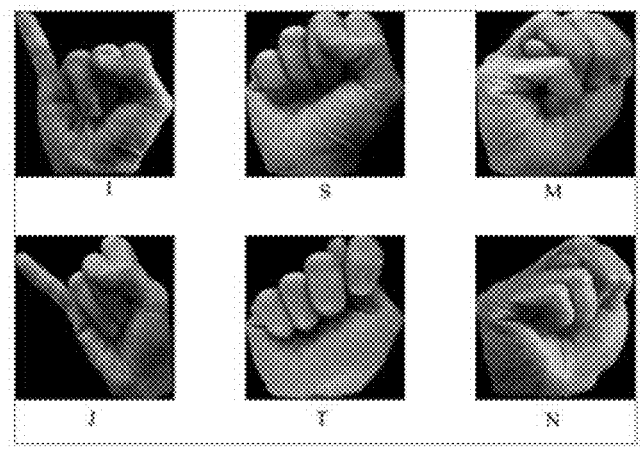
FIG. 10 shows examples of challenging cases arising due to inter-class similarity in an exemplary MUASL database between letters 'I' and 'J', letters 'S' and 'T', and letters 'M' and 'N' in accordance with some implementations.

As shown in Table 5, the exemplary method outperformed all other techniques involved in the comparison. In some implementations, spatial images were combined with phase responses of a multi-scale and a multi-orientation Gabor filter bank. The exemplary method was able to discriminate between most of the challenging cases with high inter-class similarity; examples are shown in FIG. 10. More specifically, FIG. 10 shows examples of challenging cases arising due to inter-class similarity in an exemplary MUASL database between letters 'I' and 'J', letters 'S' and 'T', and letters 'M' and 'N' that were classified correctly (except 2 cases of N and 1 case of M) in accordance with some implementations.

Figure 9:
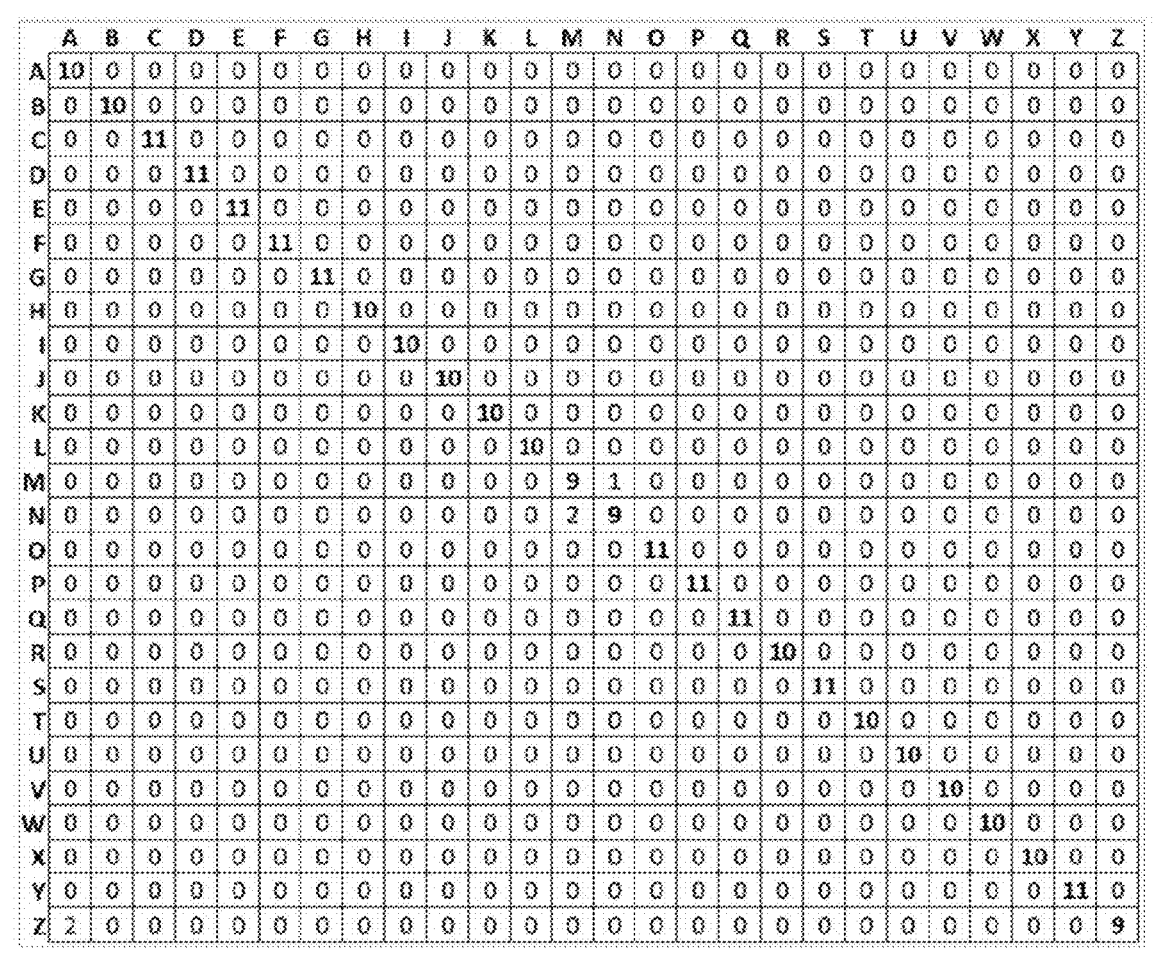
Figure 11:
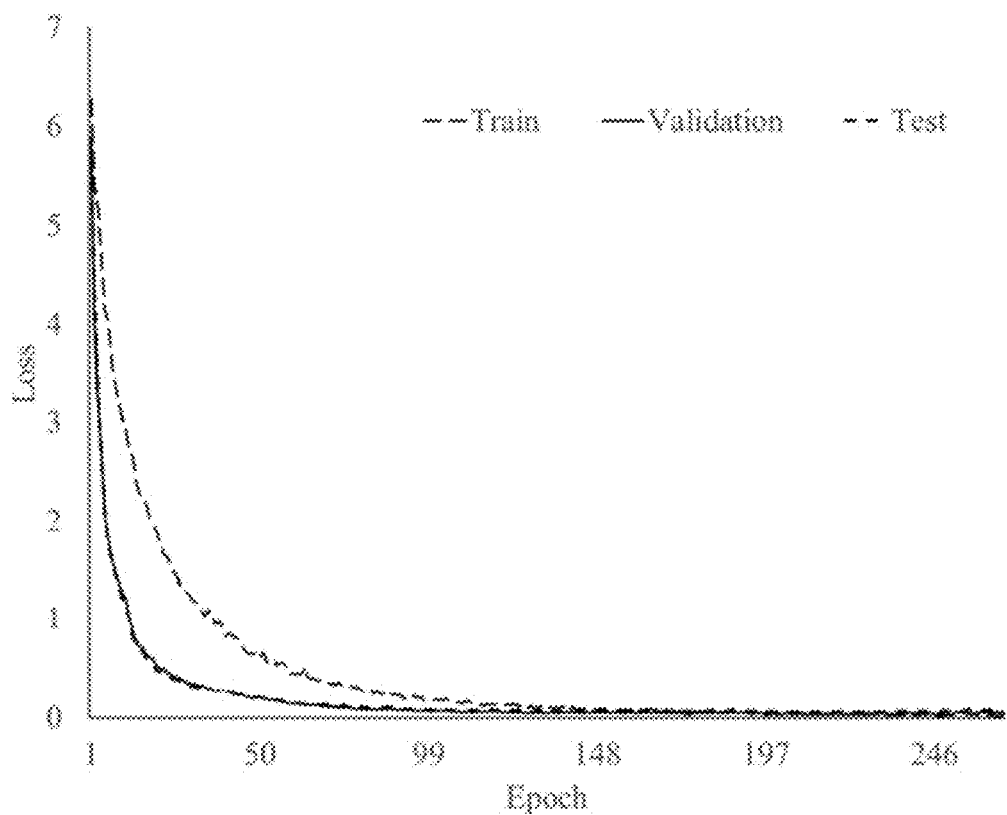
FIG. 11 is an example graph showing changes in an example loss function during training, validation, and testing of an exemplary MUASL database in accordance with some implementations.

The corresponding confusion matrix for an experiment with 26 signs of the MUSAL database in some implementations is shown in FIG. 9. More specifically, FIG. 9 is an example confusion matrix using an exemplary MUASL database with 26 hand gestures in accordance with some implementations. Misclassifications appear mostly between the two highly similar alphabets, 'M' and 'N'. On the other hand, the exemplary method correctly classified other highly similar signs, e.g., 'I' and 'J' and 'S' and 'T', both of which are challenges for other systems. (See, Aowal M A, Zaman A S, Rahman S M, Hatzinakos D (2014) *Static hand gesture recognition using discriminative 2d zernike moments.* In: TENCON 2014-2014 IEEE Region 10 Conference, IEEE, pp 1-5; and Ranga V, Yadav N, Garg P (2018) *American sign language fingerspelling using hybrid discrete wavelet transform-gabor filter and convolutional neural network.* Journal of Engineering Science and Technology 13(9):2655-2669, which are incorporated herein by reference). In some implementations, the changes in the loss function are depicted in FIG. 11. More specifically, FIG. 11 is an example graph showing changes in an example loss function during training, validation, and testing of an exemplary MUASL database in accordance with some implementations.

Automatic recognition of hand gestures has gained importance for sign language recognition and human-machine interaction. Some implementations combine spectral and spatial modalities of hand images using Gabor filters and convolutional neural networks. In some implementations, cropped and noisy images are added to the training datasets to enhance the generalization of the exemplary method/system. Various conditions and combinations have been evaluated using multiple datasets in some implementations. The results have been compared statistically and accuracies of almost 99.9% and 93.2% have been achieved for signer-dependent and signer-independent approaches, respectively.

Figure 8:
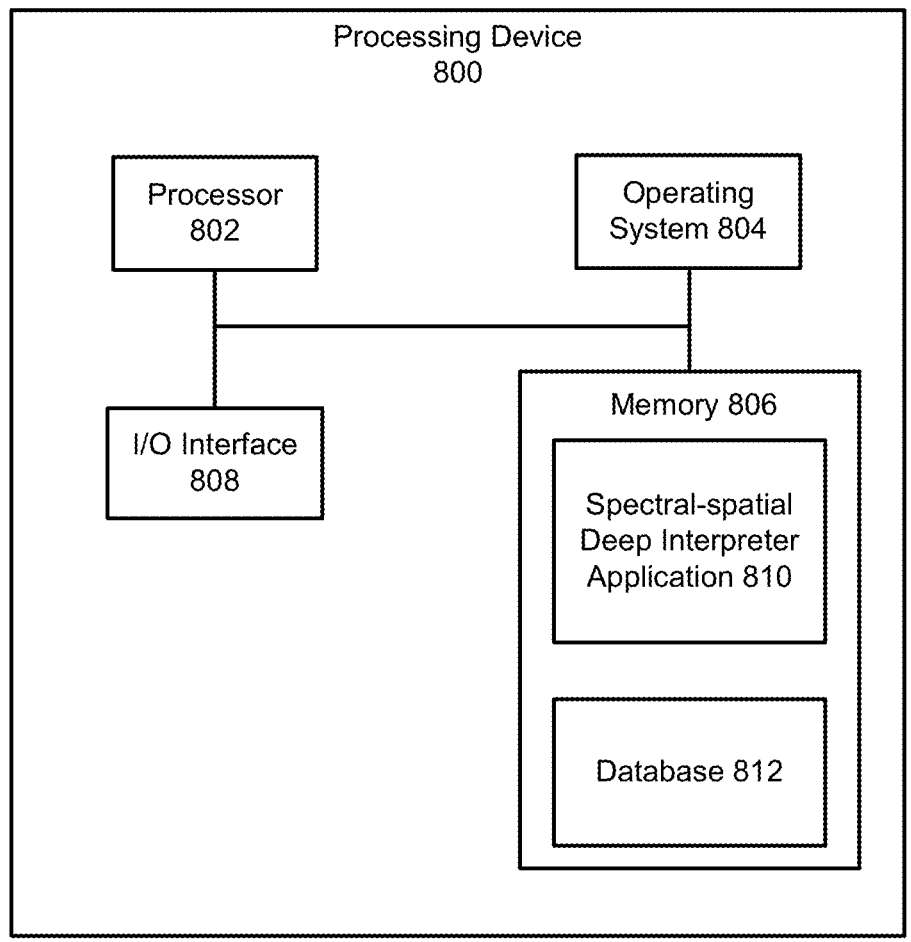
FIG. 8 is a diagram showing an example computing device configured for recognition of hand gestures of a sign language in accordance with some implementations.

FIG. 8 is a block diagram of an example processing device 800 which may be used to implement one or more features described herein. In one example, device 800 may be used to implement a computer device or system for recognizing hand gestures (e.g., visual hand gestures) of a sign language as described herein and perform the appropriate method implementations described herein. Device 800 can be any suitable computer system, server, or other electronic or hardware device. For example, the device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, an operating system 804, a memory 806, and input/output (I/O) interface 808.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 806 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 806 can store software operating on the device 800 by the processor 802, including an operating system 804, one or more applications 810, and a database 812. In some implementations, applications 810 can include instructions that enable processor 802 to perform the functions described herein (e.g., in FIG. 1).

For example, application 810 can include recognition of hand gestures of a sign language as described herein. Any of software in memory 804 can alternatively be stored on any other suitable storage location or computer-readable medium. In addition, memory 804 (and/or other connected storage device(s)) can store machine learning model (e.g., SVM) information, and/or other instructions and data used in the features described herein. Memory 804 and any other type of storage (magnetic disk, optical disk, magnetic tape, or other tangible media) can be considered "storage" or "storage devices."

I/O interface 808 can provide functions to enable interfacing the processing device 800 with other systems and devices. For example, network communication devices, storage devices (e.g., memory and/or database), and input/output devices can communicate via interface 808. In some implementations, the I/O interface 808 can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 806, I/O interface 808, and software block 810. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein.

In general, a computer that performs the processes described herein can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The processor may contain one or more processors and even may be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A computerized method for recognizing one or more hand gestures of a hand-based signal or conversation, the method comprising:
   obtaining one or more unprocessed images of the hand-based signal or conversation, wherein the one or more unprocessed images include images of at least one of the one or more hand gestures, and wherein the one or more unprocessed images are being processed to determine a meaning of the hand-based signal or conversation;
   extracting a plurality of spectral features from the one or more unprocessed images using a Gabor filter bank, wherein the Gabor filter bank performs Gabor filtering on the one or more unprocessed images, and wherein imaginary, phase, magnitude, and real Gabor responses are extracted from the plurality of spectral features;
   concatenating the plurality of the extracted spectral features and the at least one of the one or more unprocessed images of the one or more hand gestures to generate an input layer of n feature maps of size 28×28, where $1 \leq n \leq 17$;
   receiving the one or more unprocessed images of the one or more hand gestures and the extracted one or more spectral features by a Convolution Neural Network (CNN);
   filtering the input layer by a first convolution layer followed by a first rectified linear (ReLU) activation function to generate 128 feature maps with a size of 26×26;
   subsampling the 128 feature maps with a size of 26×26 with a first 2×2 max-pooling window with a stride of 2 pixels to generate 128 feature maps with a size of 13×13;
   filtering the 128 feature maps with a size of 13×13 by a second convolution layer followed by a second ReLU activation function and subsampling with a second 2×2 max-pooling window with a stride of 2 pixels to generate 128 feature maps with a size of 11×11;
   filtering the 128 feature maps with a size of 11×11 by a third convolution layer followed by a third ReLU activation function and subsampling with a third 2×2 max-pooling window with a stride of 2 pixels to generate 128 feature maps with a size of 9×9;
   performing a batch normalization on the 128 feature maps with a size of 9×9 to generate 128 feature maps with a size of 4×4;
   applying a drop-out layer to the 128 feature maps with a size of 4×4 to generate 1024 feature maps with a size of 1×1;
   applying the 1024 feature maps with a size of 1×1 to a first fully connected layer (FC) of 1024 neurons followed by a fourth ReLu activation function to generate 1024 first fully connected feature maps with a size of 1×1;
   applying the 1024 first fully connected feature maps with a size of 1×1 to a second FC layer consisting of a number of neurons of a training dataset to generate 1024 second fully connected feature maps with a size of 1×1;
   applying the second fully connected feature maps to a softmax classifier;
   outputting a classification for the at least one of the one or more hand gestures using the softmax classifier, wherein the classification is selected by the CNN from among a plurality of candidate classifications to determine the meaning of the hand-based signal or conversation.

2. The method of claim 1, wherein the Gabor filter bank performs Gabor filtering with a single scale and orientation to the one or more unprocessed images of the at least one of the one or more hand gestures, such that n=1.

3. The method of claim 1, wherein the Gabor filter bank performs Gabor filtering with four scales and four orientations to the one or more unprocessed images of the at least one of the one or more hand gestures, such that n=16.

4. The method of claim 1, wherein the first convolution layer has an architecture that includes 128 kernels of size 5×5 with a stride of 1 pixel.

5. The method of claim 1, wherein the hand-based signal or conversation includes a sign language that comprises at least one of an American MNIST replacement sign language alphabet (MNIST ASL), an Arabic sign language alphabet (ArSL), or a Massey University ASL dataset (MUASL).

6. The method of claim 5, further comprising:
   creating the training dataset from the sign language, wherein the training dataset includes at least one of cropped hand gesture images, hand gesture images with noise added thereto, or the cropped hand gesture images with the noise added thereto.

7. A system for recognizing one or more hand gestures of a hand-based signal or conversation, the system comprising:
one or more processors and a non-transitory computer readable storage having software instructions stored thereon configured to cause the one or more processors to:
obtain one or more unprocessed images of the hand-based signal or conversation, wherein the one or more unprocessed images include images of at least one of the one or more hand gestures, and wherein the one or more unprocessed images are being processed to determine a meaning of the hand-based signal or conversation;
extract a plurality of spectral features from the one or more unprocessed images using a Gabor filter bank, wherein the Gabor filter bank performs Gabor filtering on the one or more unprocessed images, and wherein imaginary, phase, magnitude, and real Gabor responses are extracted from the plurality of spectral features;
concatenate the plurality of the extracted spectral features and the at least one of the one or more unprocessed images of the one or more hand gestures to generate an input layer of n feature maps of size 28×28, where $1 \leq n \leq 17$;
receive the one or more unprocessed images of the one or more hand gestures and the extracted one or more spectral features by a Convolution Neural Network (CNN);
filter the input layer by a first convolution layer followed by a first rectified linear (ReLU) activation function to generate 128 feature maps with a size of 26×26;
subsample the 128 feature maps with a size of 26×26 with a first 2×2 max-pooling window with a stride of 2 pixels to generate 128 feature maps with a size of 13×13;
filter the 128 feature maps with a size of 13×13 by a second convolution layer followed by a second ReLU activation function and subsampling with a second 2×2 max-pooling window with a stride of 2 pixels, to generate 128 feature maps with a size of 11×11;
filter the 128 feature maps with a size of 11×11 by a third convolution layer followed by a third ReLU activation function and subsampling with a third 2×2 max-pooling window with a stride of 2 pixels to generate 128 feature maps with a size of 9×9;
perform a batch normalization on the 128 feature maps with a size of 9×9 to generate 128 feature maps with a size of 4×4;
apply a drop-out layer to the 128 feature maps with a size of 4×4 to generate 1024 feature maps with a size of 1×1;
apply the 1024 feature maps with a size of 1×1 to a first fully connected layer (FC) of 1024 neurons followed by a fourth ReLu activation function to generate 1024 fully connected feature maps with a size of 1×1;
apply the 1024 fully connected feature maps with a size of 1×1 to a second FC layer consisting of a number of neurons of a training database to generate 1024 second fully connected feature maps with a size of 1×1;
apply the second fully connected feature maps to a softmax classifier;
output a classification for the at least one of the one or more hand gestures using the softmax classifier, wherein the classification is selected by the CNN from among a plurality of candidate classifications to determine the meaning of the hand-based signal or conversation.

8. The system of claim 7, wherein the Gabor filter bank performs Gabor filtering with a single scale and orientation to the one or more unprocessed images of the at least one of the one or more hand gestures, such that n=1.

9. The system of claim 7, wherein the Gabor filter bank performs Gabor filtering with four scales and four orientations to the one or more unprocessed images of the at least one of the one or more hand gestures, such that n=16.

10. The system of claim 7, wherein the Convolution Neural Network (CNN) has an architecture that includes a convolution layer with 128 kernels of size 5×5 with a stride of 1 pixel.

11. A non-transitory computer readable medium having instructions stored therein that, when executed by one or more processors, cause the one or more processors to perform a method for recognizing one or more hand gestures of a hand-based signal or conversation, the method comprising:
obtaining one or more unprocessed images of the hand-based signal or conversation, wherein the one or more unprocessed images include images of at least one of the one or more hand gestures, and wherein the one or more unprocessed images are being processed to determine a meaning of the hand-based signal or conversation;
extracting a plurality of spectral features from the one or more unprocessed images using a Gabor filter bank, wherein the Gabor filter bank performs Gabor filtering on the one or more unprocessed images, and wherein imaginary, phase, magnitude, and real Gabor responses are extracted from the plurality of spectral features;
concatenating the plurality of the extracted spectral features and the at least one of the one or more unprocessed images of the one or more hand gestures to generate an input layer of n feature maps of size 28×28, where $1 \leq n \leq 17$;
receiving the one or more unprocessed images of the one or more hand gestures and the extracted one or more spectral features by a Convolution Neural Network (CNN);
filtering the input layer by a first convolution layer followed by a first rectified linear (ReLU) activation function to generate 128 feature maps with a size of 26×26;
subsampling the 128 feature maps with a size of 26×26 with a first 2×2 max-pooling window with a stride of 2 pixels to generate 128 feature maps with a size of 13×13;
filtering the 128 feature maps with a size of 13×13 by a second convolution layer followed by a second ReLU activation function and subsampling with a second 2×2 max-pooling window with a stride of 2 pixels to generate 128 feature maps with a size of 11×11;
filtering the 128 feature maps with a size of 11×11 by a third convolution layer followed by a third ReLU activation function and subsampling with a third 2×2 max-pooling window with a stride of 2 pixels to generate 128 feature maps with a size of 9×9;
Performing a batch normalization on the 128 feature maps with a size of 9×9 to generate 128 feature maps with a size of 4×4;
applying a drop-out layer to the 128 feature maps with a size of 4×4 to generate 1024 feature maps with a size of 1×1;
applying the 1024 feature maps with a size of 1×1 to a first fully connected layer (FC) of 1024 neurons followed by a fourth ReLu activation function to generate 1024 fully connected feature maps with a size of 1×1;

applying the 1024 first fully connected feature maps with a size of 1×1 to a second FC layer consisting of a number of neurons of a training dataset to generate 1024 second fully connected feature maps with a size of 1×1;

applying the second fully connected feature maps to a softmax classifier;

outputting a classification for the at least one of the one or more hand gestures using the softmax classifier, wherein the classification is selected by the CNN from among a plurality of candidate classifications to determine the meaning of the hand-based signal or conversation.

12. The non-transitory computer readable medium of claim 11, wherein the Gabor filter bank performs Gabor filtering with a single scale and orientation to the one or more unprocessed images of the at least one of the one or more hand gestures, such that n=1.

13. The non-transitory computer readable medium of claim 11, wherein the Gabor filter bank performs Gabor filtering with four scales and four orientations to the one or more unprocessed images of the at least one of the one or more hand gestures, such that n=16.

14. The non-transitory computer readable medium of claim 11, wherein the Convolution Neural Network (CNN) has an architecture that includes a convolution layer with 128 kernels of size 5×5 with a stride of 1 pixel.

15. The non-transitory computer readable medium of claim 11, wherein the hand-based signal or conversation includes a sign language that comprises at least one of an American MNIST replacement sign language (MNIST) alphabet, an Arabic sign language (ArSL) alphabet, or a Massey University ASL (MUASL) dataset.

16. The non-transitory computer readable medium of claim 15, further comprising:
creating the training dataset from the sign language, wherein the training dataset includes at least one of cropped hand gesture images, hand gesture images with noise added thereto, or the cropped hand gesture images with the noise added thereto.

17. The method of claim 6, wherein creating the training dataset from the sign language comprises:
preprocessing the sign language by applying background and foreground segmentation;
performing image recognition to identify hands and arms;
cropping the identified hands and arms to generate a set of cropped hand sign images;
Gabor filtering the set of cropped hand sign images; and
adding Gaussian noise and salt and pepper noise to the filtered set of cropped hand sign images.

18. The non-transitory computer readable medium of claim 16, wherein creating the training dataset from the sign language comprises:
preprocessing the sign language by applying background and foreground segmentation;
performing image recognition to identify hands and arms;
cropping the identified hands and arms to generate a set of cropped hand sign images;
Gabor filtering the set of cropped hand sign images; and
adding Gaussian noise and salt and pepper noise to the filtered set of cropped hand sign images.

* * * * *